United States Patent
Ohta

(10) Patent No.: US 7,085,219 B2
(45) Date of Patent: Aug. 1, 2006

(54) OPTICAL LENS AND OPTICAL INFORMATION RECORDING AND REPRODUCING APPARATUS

(75) Inventor: Tatsuo Ohta, Tokyo (JP)

(73) Assignee: Konica Opto Corporation, Tokyo (JP)

( * ) Notice: Subject to any disclaimer, the term of this patent is extended or adjusted under 35 U.S.C. 154(b) by 498 days.

(21) Appl. No.: 10/463,886

(22) Filed: Jun. 18, 2003

(65) Prior Publication Data

US 2004/0233823 A1 Nov. 25, 2004

(30) Foreign Application Priority Data

May 23, 2003 (JP) .............................. 2003-146683

(51) Int. Cl.
*G11B 7/135* (2006.01)

(52) U.S. Cl. ............................. 369/112.26; 369/112.22

(58) Field of Classification Search ..................... None
See application file for complete search history.

(56) References Cited

U.S. PATENT DOCUMENTS

| | | | |
|---|---|---|---|
| 6,388,822 B1 * | 5/2002 | Kitamura et al. ........... | 359/793 |
| 2002/0126400 A1 * | 9/2002 | Muller-Rissmann et al. .......... | 359/820 |
| 2003/0026006 A1 * | 2/2003 | Kitamura et al. ........... | 359/719 |
| 2003/0095492 A1 * | 5/2003 | Nishino et al. ........ | 369/112.08 |
| 2003/0103271 A1 * | 6/2003 | Ohta ......................... | 359/719 |

FOREIGN PATENT DOCUMENTS

| | | | |
|---|---|---|---|
| JP | 10-160906 | | 6/1998 |
| JP | 10160906 A | * | 6/1998 |
| JP | 11-222446 | | 8/1999 |
| JP | 2000-147209 | | 5/2000 |
| JP | 2001-006204 | | 1/2001 |
| JP | 2001052366 A | * | 2/2001 |
| JP | 2001-100008 | | 4/2001 |

\* cited by examiner

*Primary Examiner*—William Korzuch
*Assistant Examiner*—Tawfik Goma
(74) *Attorney, Agent, or Firm*—Cohen, Pontani, Lieberman & Pavane

(57) ABSTRACT

An optical lens for condensing a light emitted from a laser light source on an optical recording medium, the light having a wavelength $\lambda 1$ within a wavelength range from 400 nm to 440 nm, comprises: a light incident side lens surface disposed on a side which the light emitted from the laser light source enters, the light incident side lens surface comprising a peripheral part having an angle $\theta$ of 45 degrees or more, where the $\theta$ is an angle formed by a normal line at a position on each lens surface and an optical axis; and a first anti-reflection film formed on the light incident side lens surface, the first anti-reflection film having a film thickness which is set so that a wavelength $\lambda 2$ at which a reflectance of the light entering a central part having the angle $\theta$ of zero degrees, of the light incident side lens surface at an angle of zero degrees has a local minimum value, satisfies $\lambda 1 < \lambda 2$ and $420 \text{ nm} \leq \lambda 2 \leq 680 \text{ nm}$.

24 Claims, 15 Drawing Sheets

FIG.5

| LAYER / λ (nm) | NO.1 | NO.2 | NO.3 | NO.4 | NO.5 | NO.6 | NO.7 | NO.8 | NO.9 | NO.10 | NO.11 | NO.12 | NO.13 | NO.14 |
|---|---|---|---|---|---|---|---|---|---|---|---|---|---|---|
|  | 600 | 650 | 670 | 680 | 700 | 710 | 750 | 780 | 790 | 800 | 820 | 850 | 870 | 890 |
| FILM THICKNESS OF FIRST LAYER CERIUM OXIDE (nm) | 44.1 | 47.8 | 48.1 | 50.0 | 51.2 | 52.2 | 55.2 | 57.1 | 58.1 | 58.8 | 60.3 | 62.5 | 63.9 | 65.4 |
| FILM THICKNESS OF SECOND LAYER SILICON OXIDE (nm) | 121.2 | 131.3 | 134.2 | 137.3 | 140.1 | 143.4 | 151.4 | 156.2 | 159.5 | 161.5 | 165.6 | 175.8 | 175.7 | 184 |

FIG.6A

| λ12(λ14) / λ13 | | 650(540) | 680(560) | 710(590) | 750(620) | 790(660) | 800(670) | 820(680) | 850(705) | 870(722) | 890(740) |
|---|---|---|---|---|---|---|---|---|---|---|---|
| 600 | A | 93.2~94.1 ×, ○ | 93.4~94.6 ×, ○ | 93.4~95.1 ×, ○ | 93.8~95.1 ×, ○ | 94.1~95.9 ×, ○ | 94.2~96.1 ×, ○ | 94.4~96.5 ×, ○ | 94.3~96.1 ×, ○ | 94.1~95.8 ×, ○ | 93.5~93.9 ×, × |
| | B | 92.8~94.5 ×, ○ | 93.1~94.8 ×, ○ | 93.2~95.2 ×, ○ | 93.4~95.4 ×, ○ | 93.6~95.7 ×, ○ | 94.2~96.1 ×, ○ | 94.5~96.5 ×, ○ | 94.6~96.7 ×, ○ | 94.7~96.1 ×, ○ | 94.8~96 ×, × |
| 650 | A | 94.1~94.8 ×, × | 95~95.8 △, ○ | 95.1~95.9 △, ○ | 95.4~96.2 △, ○ | 95.6~96.5 △, ○ | | 95.3~96.8 △, ○ | | | 93.7~94.2 ×, × |
| | B | 93.2~94.1 ×, × | 93.8~95.1 ×, × | 94.1~95.2 ×, ○ | 94.1~95.2 ×, ○ | 95~95.8 ○, ○ | | 95.5~96.2 ○, ○ | | | 95.4~96.2 ○, × |
| 680 | A | 94.5~95.2 ×, × | 95.1~95.9 △, ○ | 96.1~96.9 ○, ○ | 96.4~96.8 ○, ○ | 96.3~96.7 ○, ○ | 96.2~96.7 ○, ○ | 96.1~96.6 ○, ○ | 96.0~96.5 ○, ○ | 95.5~96.2 ○, △ | 93.8~94.7 ×, × |
| | B | 93.5~94.6 ×, × | 94.5~95.5 ×, ○ | 94.3~95.4 ×, ○ | 94.5~95.4 ×, ○ | 95.6~96.5 ○, ○ | 95.2~96.2 ○, ○ | 95.8~96.4 ○, ○ | 95.9~96.8 ○, ○ | 96.2~97 ○, ○ | 96.1~96.8 ○, × |
| 710 | A | 94.8~95.7 ×, × | 95.3~96.1 △, ○ | 96~97.3 ○, ○ | 96.5~97.8 ○, ○ | 96.5~97.5 ○, ○ | 96.4~96.9 ○, ○ | 96.3~96.5 ○, ○ | 96.2~96.5 ○, ○ | 95.7~96.1 ○, △ | 94.2~94.8 ×, × |
| | B | 93.8~94.8 ×, × | 94.3~95.7 ×, △ | 95.1~95.8 ×, ○ | 95.1~96.2 ×, ○ | 95.8~96.4 ○, ○ | 95~96.5 ○, ○ | 96.2~96.8 ○, ○ | 96.5~97 ○, ○ | 96.7~97.5 ○, ○ | 96.3~97.1 ○, × |

FIG.6B

| λ12 (λ14) / λ13 | | 650 (540) | 680 (560) | 710 (590) | 750 (620) | 790 (660) | 800 (670) | 820 (680) | 850 (705) | 870 (722) | 890 (740) |
|---|---|---|---|---|---|---|---|---|---|---|---|
| 750 | A | 94~95.3 ×, × | 95.4~96.3 △, ○ | 96.0~96.8 ○, ○ | 96.4~97.2 ○, ○ | 96.5~97.2 ○, ○ | 96.3~96.9 ○, ○ | 96.1~96.8 ○, ○ | 95.8~96.4 △, ○ | 95.2~95.8 △, ○ | 94.0~94.7 ×, × |
|  | B | 94.3~95.1 ×, × | 95~95.8 ○, × | 95.1~96.1 ○, ○ | 95.5~96.3 ○, ○ | 95.9~96.2 ○, ○ | 96.1~96.6 ○, ○ | 96.3~97.1 ○, ○ | 96.8~97.6 △, ○ | 97.1~97.7 ○, ○ | 97.0~97.7 ○, × |
| 790 | A | 93.8~94.8 ×, × | 95.1~96.2 △, ○ | 96~96.3 ○, ○ | 96.1~96.8 ○, ○ | 96.2~97.1 ○, ○ | 96.1~96.8 △, ○ | 96.3~96.9 △, ○ | 95.2~95.5 △, ○ | 95.0~95.4 △, ○ | 93.8~94.5 ×, × |
|  | B | 94.5~95.3 × | 95.2~96 ○, ○ | 95.5~96.5 ○, ○ | 95.8~96.5 ○, ○ | 96~96.4 ○, ○ | 96.5~97.2 ○, ○ | 96.5~97.2 ○, ○ | 96.9~97.5 ○, ○ | 97.3~98.1 ○, ○ | 96.9~97.5 ○, × |
| 800 | A | 93.4~94.2 ×, × | 94.8~95.3 ×, ○ | 94.8~95.7 ×, ○ | 95.1~95.8 △, ○ | 95.4~96.2 ○, ○ | 95.8~96 ○, ○ | 95.0~95.8 △, ○ | 94~94.8 ×, × | 93.8~94.2 ×, × | 93.2~93.9 ×, × |
|  | B | 94.6~95.7 ×, × | 95.4~96.5 ○, ○ | 95.8~96.8 ○, ○ | 96.1~97 ○, ○ | 96.2~97 ○, ○ | 96.5~97 ○, ○ | 96.8~98 ○, ○ | 97.1~98.3 ○, ○ | 97.5~98.4 ○, ○ | 97.3~97.9 ○, × |
| 820 | A | 93.5~94.4 ×, × | 93.8~94.9 ×, × | 94.1~95 ×, ○ | 94.3~95.2 ×, ○ | 94.1~95 ×, ○ | 93.7~95.1 ×, ○ | 93.4~94.1 ×, × | 93.2~93.8 ×, × | 92.8~93.5 ×, × | 92.1~93.2 ×, × |
|  | B | 94.8~95.7 ×, × | 95.1~96.1 ○, ○ | 95.6~96.2 ○, ○ | 96~96.9 ○, ○ | 96.2~97 ×, ○ | 96.3~97 ○, ○ | 96.5~97.3 ○, ○ | 96.8~97.9 ○, ○ | 97.1~97.7 ○, ○ | 96.1~96.8 ○, × |

FIG.8A

| LAYER | NO.1' | NO.2' | NO.3' | NO.4' | NO.5' | NO.6' | NO.7' | NO.8' | NO.9' | NO.10' |
|---|---|---|---|---|---|---|---|---|---|---|
| λ (nm) | 370 | 380 | 390 | 400 | 405 | 410 | 420 | 430 | 440 | 450 |
| FILM THICKNESS OF FIRST LAYER MIXTURE OF TANTALUM OXIDE AND TITANIUM OXIDE (nm) | 14.8 | 15.2 | 15.6 | 16.0 | 16.2 | 16.4 | 16.8 | 17.2 | 17.6 | 18.0 |
| FILM THICKNESS OF SECOND LAYER SILICON OXIDE (nm) | 81.7 | 83.9 | 86.1 | 88.3 | 89.4 | 90.5 | 92.7 | 94.9 | 97.1 | 99.3 |

FIG.8B

| LAYER \ λ (nm) | NO.11' 460 | NO.12' 480 | NO.13' 500 | NO.14' 530 | NO.15' 570 | NO.16' 600 | NO.17' 650 | NO.18' 680 | NO.19' 720 | NO.20' 750 | NO.21' 800 |
|---|---|---|---|---|---|---|---|---|---|---|---|
| FILM THICKNESS OF FIRST LAYER MIXTURE OF TANTALUM OXIDE AND TITANIUM OXIDE (nm) | 19.0 | 19.5 | 20.5 | 21.2 | 22.3 | 25.5 | 25.9 | 26.5 | 28.7 | 29.9 | 31.9 |
| FILM THICKNESS OF SECOND LAYER SILICON OXIDE (nm) | 100.0 | 105.0 | 110.0 | 117.0 | 123.6 | 133.5 | 143.5 | 148.0 | 158.9 | 166.0 | 176.5 |

FIG. 9A

| λ2(λ3) / λ4 | | 380(310) | 400(330) | 420(340) | 440(360) | 480(400) | 500(410) | 530(440) | 570(480) | 600(500) | 650(540) | 680(560) | 710(590) | 750(620) | 770(640) | 800(660) |
|---|---|---|---|---|---|---|---|---|---|---|---|---|---|---|---|---|
| 350 | C | x, x | 93.1~94.8 x, x | x, x | x, x | x, x | 94.5~95.8 (95.3) x, x | x, O | x, O | 94.6~96.1 x, O | x, O | x, x | | | x, x | x, x |
| 380 | C | | 93.8~95.5 x, x | 94.2~95.5 x, x | 94.4~95.9 (95.7) x, x | 94.6~96.1 (95.8) x, x | 94.7~96.2 (96.0) x, O | 94.6~96.3 (96.1) x, O | 94.7~96.4 (96.2) x, O | 94.8~96.8 (96.2) x, O | 94.7~96.2 x, O | x, x | x, x | x, x | | |
| 405 | C | | 94.5~95.8 x, x | 95.1~96.1 △, O | 95.3~96.2 (96.0) △, O | 95.7~96.8 (96.4) △, O | 95.8~96.9 (96.5) △, O | 95.3~96.8 (96.5) △, O | 95.4~96.8 (96.4) △, O | 95.3~96.9 (96.3) △, O | 95.2~96.5 △, O | 95.1~96.4 △, x | x, x | | | |
| 410 | C | | 94.7~95.8 x, x | 95.1~96.2 △, O | 95.8~96.8 (96.3) △, O | 96.3~97.2 (97.1) O, O | 96.7~97.5 (97.2) O, O | 96.3~97.1 (97.0) O, O | 96.1~97.0 (97.0) O, O | 95.8~96.7 (96.5) △, O | 95.5~96.6 (96.5) △, O | 95.4~96.6 △, x | 94.8~95.8 x, x | | | |
| 440 | C | | 94.8~95.9 x, x | 95.4~96.4 △, O | 96.1~96.8 (96.4) O, O | 96.1~97.1 (97.0) O, O | 96.2~97.3 (97.2) O, O | 96.9~97.6 (97.3) O, O | 96.8~97.8 (97.4) O, O | 96.5~97.3 (96.9) O, O | 96.1~97.1 (96.7) O, O | 95.8~96.8 △, O | 94.9~95.9 x, x | 94.1~95.4 x, x | | |

FIG.9B

| $\lambda_2(\lambda_3)$ / $\lambda_4$ | | 380 (310) | 400 (330) | 420 (340) | 440 (360) | 480 (400) | 500 (410) | 530 (440) | 570 (480) | 600 (500) | 650 (540) | 680 (560) | 710 (590) | 750 (620) | 770 (640) | 800 (660) |
|---|---|---|---|---|---|---|---|---|---|---|---|---|---|---|---|---|
| 450 | C | 93.8 ~95.1 ×, × | 94.8 ~96.0 ×, × | 95.6 ~96.8 △, ○ | 96.0 ~96.8 (96.3) ○, ○ | 96.1 ~97.0 (97.0) ○, ○ | 96.7 ~97.1 (97.0) ○, ○ | 96.8 ~97.4 (97.2) ○, ○ | 96.8 ~97.4 (97.1) ○, ○ | 96.7 ~97.5 (96.8) ○, ○ | 96.2 ~97.5 (96.7) ○, ○ | 95.8 ~96.8 (96.5) △, ○ | 94.8 ~96.1 ×, × | 93.7 ~95.1 (94.8) ×, × | | |
| 480 | C | 93.7 ~94.8 ×, × | 94.6 ~95.5 ×, × | 95.2 ~96.5 △, ○ | 95.7 ~96.6 (96.1) △, ○ | 95.8 ~96.6 (96.2) △, ○ | 96.2 ~97.2 (96.3) ○, ○ | 96.5 ~97.3 (96.77) ○, ○ | 96.4 ~97.5 (96.8) ○, ○ | 96.6 ~97.7 (96.7) ○, ○ | 96.2 ~97.5 ○, ○ | 95.8 ~96.6 △, ○ | 94.7 ~95.8 ×, × | | | |
| 500 | C | 93.1 ~94.5 ×, × | | 94.7 ~95.7 ×, ○ | 95.2 ~96.1 △, ○ | 95.2 ~95.8 △, ○ | 95.3 ~96.3 (96.5) △, ○ | 95.4 ~96.6 △, ○ | 95.6 ~97.2 (96.6) △, ○ | 95.8 ~97.5 (96.5) △, ○ | 95.4 ~96.8 △, ○ | 94.8 ~95.8 ×, × | 94.4 ~95.1 ×, × | | | |
| 530 | D | | | 93.8 ~94.8 ×, × | 94.1 ~95.6 ×, × | 94.8 ~95.8 ×, × | 95.1 ~96.1 △, × | 95.2 ~95.7 △, × | 95.4 ~96.8 △, × | 95.3 ~97.1 △, × | 95.1 ~96.5 △, × | 94.7 ~95.4 ×, × | 93.7 ~94.4 ×, × | | | |
| 560 | D | | | 93.2 ~94.5 ×, × | | 94.1 ~95.1 ×, × | 94.4 ~95.2 ×, × | 94.7 ~95.7 ×, × | 94.6 ~95.8 ×, × | 94.8 ~96.5 ×, × | 93.8 ~95.5 ×, × | 93.1 ~95.1 ×, × | | | | |

FIG.10A

| λ5 (λ6) \ λ9 | | 350 (320) | 380 (350) | 410 (370) | 420 (380) | 480 (440) | 500 (460) | 530 (490) | 560 (520) | 600 (550) | 650 (600) | 700 (650) | 770 (710) | 800 (740) |
|---|---|---|---|---|---|---|---|---|---|---|---|---|---|---|
| 350 | C | ×, × | 93.1~94.8 ×, × | ×, × | | 94.5~95.8 (95.1) ×, ○ | ×, × | 94.6~96.1 ×, ○ | ×, × | ×, × | ×, × | ×, × | ×, × | ×, × |
| 380 | C | ×, × | 93.8~95.5 ×, × | ×, × | 95.2~96.3 (96.2) △, ○ | 95.5~96.8 (96.6) △, ○ | 95.1~96.3 (96.1) △, ○ | 94.8~96.8 (96.1) ×, ○ | 95.5~96.8 ×, ○ | ×, × | ×, × | | | |
| 400 | C | ×, × | 94.7~95.8 ×, × | 95.1~96.2 (96.1) △, ○ | 96.2~97.3 (97.2) △, ○ | 96.3~97.5 (97.3) ○, ○ | 95.7~96.8 (96.7) △, ○ | 95.8~97.2 (96.5) △, ○ | 96.1~97.1 △, ○ | 94.8~95.8 ×, × | 93.8~95.1 ×, × | | | |
| 430 | C | ×, × | 94.8~95.9 (95.5) ×, × | 95.4~96.4 (96.3) △, ○ | 96.1~97.1 (97) ○, ○ | 96.2~97.2 (97.2) ○, ○ | 96.8~97.5 (96.8) ○, ○ | 97.0~97.8 ○, ○ | 96.1~97.1 ○, ○ | 95.8~96.8 △, ○ | 94.9~95.9 ×, × | 94.1~95.4 ×, × | | |
| 460 | C | 93.8~95.1 ×, × | 94.8~96.0 ×, × | 95.6~96.8 (96.2) △, ○ | 96.1~96.9 (96.7) ○, ○ | 96.7~97.1 (96.8) ○, ○ | 97.0~97.7 (96.8) ○, ○ | 97.1~98.1 ○, ○ | 96.2~97.5 ○, ○ | 95.8~96.8 △, ○ | 94.8~96.1 ×, × | 93.7~95.1 ×, × | | |

FIG.10B

| λ5(λ6)/λ9 | | 350(320) | 380(350) | 410(370) | 420(380) | 480(440) | 500(460) | 530(490) | 560(520) | 600(550) | 650(600) | 700(650) | 770(710) | 800(740) |
|---|---|---|---|---|---|---|---|---|---|---|---|---|---|---|
| 480 | C | 93.7~94.8 ×, × | 94.6~95.8 ×, × | 95.2~96.5 △, ○ | 95.5~96.7 (96.5) △, ○ | 96.2~97.2 (96.3) ○, ○ | 96.4~97.5 ○, ○ | 96.6~97.7 ○, ○ | 96.2~97.5 ○, ○ | 95.8~96.6 △, ○ | 94.7~95.8 ×, × | | | |
| 500 | D | 93.1~94.5 ×, × | | 94.7~95.7 ○ | 95.2~96.5 △, ○ | 95.3~96.7 △, ○ | 95.6~97.2 △, ○ | 95.8~97.5 △, ○ | 95.4~96.8 △, ○ | 94.8~95.8 ×, × | 94.4~95.1 ×, × | | | |
| 530 | D | | | 93.8~94.8 ×, × | 94.8~95.8 ×, × | 95.1~96.1 △, × | 95.4~96.8 △, × | 95.3~97.1 △, × | 95.1~96.5 △, × | 94.7~95.4 ×, × | 93.7~94.5 ×, × | | | |
| 560 | D | | | 93.2~94.5 ×, × | 94.1~95.1 ×, × | 94.4~95.2 ×, × | 94.6~95.8 ×, × | 94.8~96.5 ×, × | 93.8~95.5 ×, × | 93.1~95.1 ×, × | | | | |

FIG.11A

| λ7 (λ8) / λ10 | 370 (300) | 380 (310) | 400 (330) | 420 (350) | 430 (357) | 440 (365) | 460 (380) | 480 (400) | 500 (415) | 530 (440) | 560 (465) | 600 (490) | 650 (540) |
|---|---|---|---|---|---|---|---|---|---|---|---|---|---|
| 360 D |  |  |  |  |  |  |  |  |  |  | 93.5 ~94.6 ×, ○ |  |  |
| 380 C | 93.0 ~94.0 ×, × | 93.5 ~94.6 ×, × | 93.8 ~95.1 ×, ○ | 94.2 ~95.6 ×, ○ | 94.4 ~95.8 ×, ○ | 94.2 ~95.5 ×, ○ | 94.3 ~95.5 ×, ○ | 94.4 ~95.5 ×, ○ | 94.3 ~95.4 ×, ○ | 94.1 ~94.9 ×, ○ | 94.1 ~94.9 ×, ○ | 93.8 ~94.7 ×, × | 93.1 ~94.6 ×, × |
| 390 C |  ×, × | 93.8 ~95.4 ×, ○ | 94.3 ~96.0 ×, ○ | 95.2 ~96.5 (95.8) ×, △ | 95.4 ~96.4 (95.7) ×, △ | 95.2 ~96.0 (96.3) △, ○ | 95.4 ~96.3 (95.8) △, ○ | 95.3 ~96.3 △, ○ | 95.2 ~96.3 △, ○ | 95.2 ~95.8 △, ○ | 94.1 ~94.9 ×, ○ | 95.1 ~95.6 △, ○ | 94.2 ~94.7 ×, × |
| 405 C |  ×, × | 94.2 ~95.7 ×, ○ | 94.4 ~96.2 ×, ○ | 95.4 ~96.7 (96.0) △, △ | 96.1 ~97.2 (97.0) ○, ○ | 95.6 ~96.9 (96.3) ○, ○ | 95.8 ~97.2 (96.8) ○, ○ | 95.9 ~97.2 (96.7) ○, ○ | 95.4 ~97.1 (96.9) △, ○ | 95.3 ~96.8 (96.5) △, ○ | 95.1 ~95.8 △, ○ | 95.3 ~95.8 △, ○ | 94.2 ~95.3 ×, × |
| 440 C |  ×, × | 94.4 ~95.9 ×, ○ | 94.6 ~96.4 ×, ○ | 95.6 ~96.9 (96.1) △, △ | 96.1 ~97.3 (97.1) ○, ○ | 96.2 ~97.0 (97.1) ○, ○ | 96.4 ~97.2 (97.0) ○, ○ | 96.6 ~97.4 (97.2) ○, ○ | 95.8 ~97.4 (96.9) △, ○ | 95.7 ~96.8 (96.5) △, ○ | 95.6 ~96.0 △, ○ | 95.3 ~95.8 △, ○ | 94.6 ~95.3 ×, × |

FIG.11B

| λ7(λ8) / λ10 | | 370 (300) | 380 (310) | 400 (330) | 420 (350) | 430 (357) | 440 (365) | 460 (380) | 480 (400) | 500 (415) | 530 (440) | 560 (465) | 600 (490) | 650 (540) |
|---|---|---|---|---|---|---|---|---|---|---|---|---|---|---|
| 450 | C | ×, × | 94.4 ~95.3 ×, ○ | 94.6 ~96.4 ×, ○ | 95.8 ~96.9 (96.2) △, ○ | 95.9 ~97.3 (97.2) △, ○ | 96.2 ~97.3 (97.2) ○, ○ | 96.8 ~92.6 (97.3) ○, ○ | 96.8 ~97.6 (97.2) ○, ○ | 96.7 ~97.6 (96.6) ○, ○ | 96.6 ~97.1 (96.6) ○, ○ | 96.1 ~96.7 (96.2) ○, ○ | 95.8 ~96.2 △, ○ | 94.8 ~95.8 ×, × |
| 480 | C | ×, × | 93.8 ~95.3 ×, ○ | 94.1 ~95.8 ×, ○ | 95.6 ~96.4 (96.3) △, ○ | 95.8 ~96.6 (96.5) △, ○ | 95.8 ~96.8 (96.7) △, ○ | 96.2 ~97.1 (96.6) △, ○ | 96.3 ~97.3 (96.7) ○, ○ | 96.4 ~97.3 (96.5) ○, ○ | 96.2 ~96.8 (96.0) ○, ○ | 95.2 ~95.7 (96.0) △, ○ | 95.0 ~95.6 △, ○ | 94.6 ~95.5 ×, × |
| 500 | C | ×, × | 93.5 ~94.5 ×, × | 93.8 ~95.1 ×, ○ | 94.8 ~95.5 △, ○ | 95.3 ~95.8 △, ○ | 95.6 ~95.9 (95.9) △, ○ | 95.8 ~96.2 (96.1) △, ○ | 95.9 ~96.3 △, ○ | 95.8 ~96.3 △, ○ | 95.6 ~95.8 △, ○ | 94.1 ~94.9 ×, ○ | 93.7 ~94.5 ×, ○ | ×, × |
| 530 | D | × | 92.8 ~93.8 ×, × | 93.2 ~94.7 ×, ○ | 94.3 ~94.9 ×, ○ | 94.5 ~95.3 ×, ○ | 94.7 ~95.5 ×, ○ | 94.8 ~95.7 ×, ○ | 94.9 ~95.8 ×, ○ | 94.7 ~95.5 ×, ○ | 94.3 ~95.1 ×, × | 93.8 ~94.6 ×, × | 93.1 ~94.2 ×, × | ×, × |

OPTICAL LENS AND OPTICAL INFORMATION RECORDING AND REPRODUCING APPARATUS

BACKGROUND OF THE INVENTION

1. Field of the Invention

The present invention relates to an optical lens to be mounted in an optical information recording and reproducing apparatus capable of executing at least one of the recording of information to an optical recording medium and the reproducing of the information recorded on the optical recording medium. The present invention also relates to the optical information recording and reproducing apparatus equipped with the optical lens.

2. Description of Related Art

According to an earlier development there has been an optical pickup apparatus (an optical information recording and reproducing apparatus) executing the recording of information to an optical recording medium and the reproducing of the information recorded on the optical recording medium. In the optical pickup apparatus, light emitted from a semiconductor laser light source is condensed on the information recording surface of an optical recording medium by an object lens (an optical lens) to perform the recording and the reproducing of the information.

In the object lens, an anti-reflection coat is formed on the surface of the object lens in order to improve the usability of light. The anti-reflection coat is generally formed to have a thickness which becomes thinner as a position in a peripheral part becomes more distant from the central part of the object lens. The film thickness is set in order that reflectance of the light entering the central part of the object lens perpendicularly may have a local minimum value to the wavelength of the laser beam of the optical pickup apparatus. That is, the film thickness of the anti-reflection coat is set in order that the quantity of the light which is transmitted through the central part of the object lens may be the maximum.

Now, in the anti-reflection coat, it is known that the larger the incident angle of light is, the more the wavelength dependency of the reflectance of the light shifts to a short wavelength side. Moreover, in the object lens, the more a position of the object lens is deviated to the peripheral part from the central part of the lens, the larger the incident angle of light is. Consequently, in an object lens according to an earlier development, the wavelength dependency of the reflectance of the light at the peripheral part was shifted to the shorter wavelength side more than the wavelength dependency of the reflectance of the light at the central part. As a result, the wavelength at which the reflectance of the light entering the peripheral part had a local minimum value was shorter than the wavelength at which the reflectance of the light entering the central part had a local minimum value. Hence, in the object lens provided with an anti-reflection coat according to an earlier development, the reflectance to a laser beam was higher at a peripheral part although the reflectance to the laser beam was low at the central part. Consequently, the quantity of the light which is transmitted through the peripheral part is relatively less than the quantity of the light which is transmitted through the central part. As a result, there were problems of the deterioration of the spectral intensity of the transmitted light of the whole lens, the increase in the diameter of a beam spot owing to the degradation of the focusing performance of a beam, the lowering of a beam quantity, and the like.

Moreover, in recent years, because of the increase in the capacity of the optical recording medium, it has been attempted to make the diameter of a beam spot small, that is, to stop down the beam spot sufficiently with the object lens in order to make it possible to perform the recording and the reproducing of information by the use of light in a state of high density recording. Since the diameter of a beam spot is inversely proportional to the numerical aperture (NA) of the object lens, the NA of the object lens has been heightened. Lately, a lens having an angle, which is formed by the crossing of a normal line of a lens effective diameter surface and an optical axis, of more than 45 degrees or more, or further more than 55 degrees or more has been used.

However, since the curvature of the lens surface of an object lens having a high NA is large, the incident angle of the light entering the peripheral part of the lens is very large. Consequently, the quantity of the light which is transmitted through the peripheral part is largely decreased, and it is impossible to suppress the increase in the spot diameter despite the usage of the high NA object lens. Therefore, the increase in the capacity of the optical recording medium was prevented.

Accordingly, as a technique for solving the problems described above, there is a technique for increasing the transmitted light quantity of the whole lens by increasing the transmitted light quantity at the peripheral part. The technique is disclosed in, for example, Japanese Patent Laid-Open Publication No. Hei 10-160906, Japanese Patent Laid-Open Publication No. Hei 11-222446 and Japanese Patent Laid-Open Publication No. 2001-6204.

However, when the transmitted light quantity at the peripheral part is simply increased in accordance with the Patent Documents mentioned above, the problems of the losing of the shape of a beam, the deterioration of the jitter characteristic, the increase in crosstalk and the like were produced, and there was the possibility of causing the degradation of the performance of recording and reproducing. Thus, it was difficult to optimize the balance between the light condensing performance and the light quantity.

In particular, in a Digital Versatile Disc (DVD) optical pickup lens using laser beams of two kinds of wavelengths (for example, the light having the wavelength of 660 nm and the light having the wavelength of 785 nm), it was very difficult to increase the transmitted light quantities and at the same time to optimize the beam shapes of both of the lights of the two kinds of wavelengths.

SUMMARY OF THE INVENTION

In view of the problems described above, it is an object of the present invention to provide an optical lens enabling both of the reduction of a spot diameter and the securing of a transmitted light quantity in a well-balanced state, and to provide an optical information recording and reproducing apparatus equipped with the optical lens.

In particular, it is another object of the invention to provide a high NA optical lens having superior light condensing performance, and to provide an optical information recording and reproducing apparatus capable of realizing the increase in the capacity of an optical recording medium.

Moreover, it is a further object of the invention to improve the performance of an optical lens to be used for light information recording and reproducing using a laser beam having the wavelength range from 630 nm to 680 nm, or a laser beam having the wavelength range from 400 nm to 440 nm, and the performance of an optical lens to be used for light information recording and reproducing of both of a DVD and a compact disk (CD) using laser beams of two kinds of wavelengths.

In order to achieve the objects described above, according to a first aspect of the present invention, an optical lens for condensing a light emitted from a laser light source on an optical recording medium, the light having at least one kind of a wavelength $\lambda 1$ within a wavelength range from 400 nm to 440 nm, the optical lens being mounted in an optical information recording and reproducing apparatus capable of executing at least either a record of information on the optical recording medium or a reproduction of information recorded on the optical recording medium by condensing the light on the optical recording medium, comprises:

a light incident side lens surface disposed on a side which the light emitted from the laser light source enters, the light incident side lens surface comprising a peripheral part having an angle $\theta$ of 45 degrees or more, where the $\theta$ is an angle formed by a normal line at a position on each lens surface and an optical axis; and a first anti-reflection film formed on the light incident side lens surface, the first anti-reflection film having a film thickness which is set so that a wavelength $\lambda 2$ at which a reflectance of the light entering a central part of the light incident side lens surface at an angle of zero degrees has a local minimum value, satisfies $\lambda 1 < \lambda 2$ and $420 \text{ nm} \leq \lambda 2 \leq 680$ nm, the central part having the angle $\theta$ of zero degrees.

Hereupon, it is more preferable to set the film thickness of the first anti-reflection film formed on the light incident side lens surface so that the wavelength $\lambda 2$ at which the reflectance of the light entering at the central part having the angle $\theta$ of zero degrees, of the light incident side lens surface has a local minimum value, satisfies $440 \text{ nm} \leq \lambda 2 \leq 650$ nm.

In case that a step-shaped structure, such as a diffraction grating, is provided on the lens surface, the angle $\theta$ is formed by a normal line at the position on each lens surface except the step-shaped portion and the optical axis.

According to the first aspect of the invention, since the wavelength $\lambda 2$ at which the reflectance of the light entering the central part of the light incident side lens surface at the angle of zero degrees has the local minimum value satisfies $\lambda 1 < \lambda 2$ and $420 \text{ nm} \leq \lambda 2 \leq 680$ nm, the reflectance of the light entering the central part which occupies a large area of the light incident side lens surface is lowered. The peripheral part transmits the light relatively more than the central part of the light incident side lens surface. Further, the balance between the quantity of the light transmitted through the peripheral part and the quantity of the light transmitted through the central part is improved more than a lens according to an earlier development. Therefore, it is possible to achieve the reduction in a beam spot diameter and the increase in a transmitted light quantity. That is, the performance of an optical lens to be used for optical information recording and reproducing using a laser beam of the wavelength from 400 nm to 440 nm can be more improved, and a high NA optical lens having a good light condensing performance can be provided.

In this case, the wavelength $\lambda 2$ is set to 680 nm or less. When the wavelength $\lambda 2$ is longer than 680 nm, the quantity of the light which is transmitted through the central part becomes relatively too little in comparison with the quantity of the light which is transmitted through the peripheral part. Therefore, there is a problem that the crosstalk is caused because a beam spot shape is lost.

Further, the wavelength $\lambda 2$ is set to 420 nm or more. When the wavelength $\lambda 2$ is shorter than 420 nm, the quantity of the light which is transmitted through the peripheral part does not become large. Therefore, the balance between the quantity of the light transmitted through the peripheral part and the quantity of the light transmitted through the central part cannot be improved.

Incidentally, when the light incident side lens surface includes a part having the angle $\theta$ of 53 degrees or more in the effective diameter thereof in the first aspect of the invention, the quantity of the light which is transmitted through the peripheral part having the larger angle $\theta$, can be secured. Consequently, the case contributes to a further reduction in the spot diameter.

Preferably, the film thickness of the first anti-reflection film formed on the light incident side lens surface is set so that a wavelength $\lambda 3$ at which the reflectance of the light entering the peripheral part having the angle $\theta$ of 45 degrees, of the light incident side lens surface at the angle of zero degrees has a local minimum value, may satisfy $340 \text{ nm} \leq \lambda 3 \leq 560$ nm.

In this case, the wavelength $\lambda 3$ at which the reflectance of the light entering the peripheral part of the light incident side lens surface at the angle of zero degrees has the local minimum value, satisfies $340 \text{ nm} \leq \lambda 3 \leq 560$ nm, and is substantially equal to the wavelength $\lambda 1$ of the laser light source within the range from 400 nm to 440 nm. Consequently, it can be suppressed that the quantity of the light through the peripheral part having the relatively large angle $\theta$, of the light incident side lens surface becomes relatively too small in comparison with the quantity of the light transmitted through the central part of the lens surface. The balance between the quantity of the light transmitted through the peripheral part and the quantity of the light transmitted through the central part can be improved more than a lens according to an earlier development. Hence, the loss of a beam spot shape can be securely prevented, and a spot diameter can be reduced in a good balance. Furthermore, a transmitted light quantity can be secured.

Preferably, the optical lens further comprises a light emergent side lens surface disposed on a side of emitting the light, the light emergent lens surface comprising a second anti-reflection film formed thereon, wherein the second anti-reflection film has a film thickness which is set so that a wavelength $\lambda 4$ at which a reflectance of the light entering a central part having the angle $\theta$ of zero degrees, of the light emergent side lens surface at the angle of zero degrees as a local minimum value, satisfies $405 \text{ nm} \leq \lambda 4 \leq 500$ nm.

Hereupon, it is more preferable to set the film thickness of the anti-reflection film formed on the light emergent side lens surface so that the wavelength $\lambda 4$ at which the reflectance of the light entering the central part having the angle $\theta$ of zero degrees, of the light incident side lens surface has a local minimum value, $405 \text{ nm} \leq \lambda 4 \leq 480$ nm.

In this case, since the wavelength $\lambda 4$ at which the reflectance of the light entering the central part of the light emergent side lens surface at the angle of zero degrees has the local minimum value, satisfies $405 \text{ nm} \leq \lambda 4 \leq 500$ nm, the balance between the quantity of the light transmitted through the peripheral part and the quantity of the light transmitted through the central part can be improved. Consequently, it is possible to reduce a beam spot diameter and increase a transmitted light quantity by the first anti-reflection film formed on the light incident side lens surface and the second anti-reflection film formed on the light emergent side lens surface.

Preferably, the film thickness of the first anti-reflection film formed on the light incident side lens surface is set so that a wavelength $\lambda 2$ at which the reflectance of the light entering the central part having the angle θ of zero degrees, of the light incident side lens surface at the angle of zero degrees has a local minimum value, satisfies 480 nm≦λ2≦570 nm.

In this case, since the wavelength λ2 at which the reflectance of the light entering the central part having the angle θ of zero degrees, of the light incident side lens surfaces at the angle of zero degrees has the local minimum value, satisfies 480 nm≦λ2≦570 nm, the balance between the quantity of the light transmitted through the peripheral part and the quantity of the light transmitted through the central part can be improved. Consequently, it is possible to reduce a beam spot diameter and increase a transmitted light quantity.

Incidentally, it is preferable that the wavelength range of the laser light source is within the range from 400 nm to 420 nm. It is more preferable that the wavelength is a general wavelength, that is, 405±5 nm. In this case, it is possible to securely reduce a beam spot diameter and increase a transmitted light quantity.

Preferably, the film thickness of the first anti-reflection film formed on the light incident side lens surface is set so that a wavelength λ3 at which the reflectance of the light entering the peripheral part having the angle θ of 45 degrees, of the light incident side lens surface at the angle of zero degrees has a local minimum value, satisfies 400 nm≦λ3≦480 nm.

In this case, since the wavelength λ3 at which the reflectance of the light entering the peripheral part of the light incident side lens surfaces at the angle of zero degrees has the local minimum value, satisfies 400 nm≦λ3≦480 nm, it can be securely suppressed that the quantity of the light transmitted through the peripheral part having the relatively large angle θ, of the light incident side lens surface becomes relatively too small in comparison with the quantity of the light transmitted through the central part of the lens surface. Hence, the loss of a beam spot shape can be prevented, and a spot diameter can be reduced in a good balance. Furthermore, a transmitted light quantity can be secured.

According to a second aspect of the present invention, an optical lens for condensing a light emitted from a laser light source on an optical recording medium, the light having at least one kind of a wavelength λ1 within a wavelength range from 400 nm to 440 nm, the optical lens being mounted in an optical information recording and reproducing apparatus capable of executing at least either a record of information on the optical recording medium or a reproduction of information recorded on the optical recording medium by condensing the light on the optical recording medium, comprises:

a first lens which the light emitted from the laser light source enters and a second lens which the light passing through the first lens enters, wherein in the first lens, a first light incident side lens surface disposed on a side which the light emitted from the laser light source enters, comprises a peripheral part having an angle θ of 30 degrees or more, and in the second lens, a second light incident side lens surface disposed on a side which the light emitted from the laser light source enters comprises a peripheral part having the angle θ of 45 degrees or more, where the θ is an angle formed by a normal line at a position on each lens surface and an optical axis; and a first anti-reflection film is formed on the first light incident side lens surface, and a film thickness of the first anti-reflection film is set so that a wavelength λ5 at which a reflectance of the light entering a central part of the first light incident side lens surface at an angle of zero degrees has a local minimum value, satisfies λ1<λ5 and 410 nm≦λ5≦600 nm, the central part having the angle θ of zero degrees.

Hereupon, it is more preferable to set the film thickness of the anti-reflection film formed on the fist light incident side lens surface of the first lens so that the wavelength λ5 at which the reflectance of the light entering the central part having the angle θ of zero degrees, of the first light incident side lens surface at the angle of zero degrees has a local minimum value, satisfies 420 nm≦λ5≦560 nm.

According to the second aspect of the invention, since the wavelength λ5 at which the reflectance of the light entering the central part of the first light incident side lens surface at the angle of zero degrees has the local minimum value, satisfies λ1<λ5 and 410 nm≦λ5≦600 nm, the reflectance of the light entering the central part which occupies a large area of the first light incident side lens surface is lowered. The peripheral part transmits the light relatively more than the central part of the light incident side lens surface. Further, the balance between the quantity of the light transmitted through the peripheral part and the quantity of the light transmitted through the central part is improved more than a lens according to an earlier development. Therefore, it is possible to achieve the reduction in a beam spot diameter and the increase in a transmitted light quantity. That is, the performance of an optical lens to be used for optical information recording and reproducing using a laser beam of the wavelength from 400 nm to 440 nm can be more improved, and a high NA optical lens having a good light condensing performance can be provided.

In this case, the wavelength λ5 is set to 600 nm or less. When the wavelength λ5 is longer than 600 nm, the quantity of the light which is transmitted through the central part becomes relatively too little in comparison with the quantity of the light which is transmitted through the peripheral part. Therefore, there is a problem that the crosstalk is caused because a beam spot shape is lost.

Further, the wavelength λ5 is set to 410 nm or more. When the wavelength λ5 is shorter than 410 nm, the quantity of the light which is transmitted through the peripheral part does not become large. Therefore, the balance between the quantity of the light transmitted through the peripheral part and the quantity of the light transmitted through the central part cannot be improved.

Preferably, the film thickness of the first anti-reflection film formed on the first light incident side lens surface of the first lens is set so that a wavelength λ6 at which the reflectance of the light entering the peripheral part having the angle θ of 30 degrees, of the first light incident side lens surface at the angle of zero degrees has a local minimum value, satisfies 370 nm≦λ6≦550 nm.

In this case, the wavelength λ6 at which the reflectance of the light entering the peripheral part of the first light incident side lens surface at the angle of zero degrees has the local minimum value, satisfies 370 nm≦λ6≦550 nm, and is substantially equal to the wavelength λ1 of the laser light source within the range from 400 nm to 440 nm. Consequently, it can be suppressed that the quantity of the light through the peripheral part having the relatively large angle θ, of the first light incident side lens surface becomes relatively too small in comparison with the quantity of the light transmitted through the central part of the lens surface. The balance between the quantity of the light transmitted through the peripheral part and the quantity of the light transmitted through the central part can be improved more than a lens according to an earlier development. Hence, the loss of a beam spot shape can be securely prevented, and a spot diameter can be reduced in a good balance. Furthermore, a transmitted light quantity can be secured.

Preferably, in the second lens, a second anti-reflection film is formed on the second light incident side lens surface, and a film thickness of the second anti-reflection film is set so that a wavelength $\lambda 7$ at which a reflectance of light entering a central part having the angle $\theta$ of zero degrees, of the second light incident side lens surface at an angle of zero degrees has a local minimum value, satisfies $\lambda 1 < \lambda 7$ and 420 nm$\leq \lambda 7 \leq$600 nm.

Hereupon, it is more preferable to set the film thickness of the second anti-reflection film formed on the second light incident side lens surface of the second lens so that the wavelength $\lambda 7$ at which the reflectance of the light entering the central part having the angle $\theta$ of zero degrees, of the second light incident side lens surface at the angle of zero degrees has a local minimum value, satisfies 430 nm$\leq \lambda 7 \leq$560 nm.

In this case, since the wavelength $\lambda 7$ at which the reflectance of the light entering the central part of the second light incident side lens surface at the angle of zero degrees has the local minimum value satisfies 420 nm$\leq \lambda 7 \leq$600 nm, the reflectance of the light entering the central part which occupies a large area of the second light incident side lens surface is lowered. The peripheral part transmits the light relatively more than the central part of the second light incident side lens surface. Further, the balance between the quantity of the light transmitted through the peripheral part and the quantity of the light transmitted through the central part is improved more than a lens according to an earlier development. Therefore, it is possible to achieve the reduction in a beam spot diameter and the increase in a transmitted light quantity in a whole optical lens.

In this case, the wavelength $\lambda 7$ is set to 600 nm or less. When the wavelength $\lambda 7$ is longer than 600 nm, the transmittance of the light transmitted through the central part is too low. The quantity of the light which is transmitted through the central part becomes relatively too little in comparison with the peripheral part. Therefore, there is a problem that the crosstalk is caused because a beam spot shape is lost.

Further, the wavelength $\lambda 7$ is set to 420 nm or more. When the wavelength $\lambda 7$ is shorter than 420 nm, the quantity of the light which is transmitted through the peripheral part does not become large. Therefore, the balance between the quantity of the light transmitted through the peripheral part and the quantity of the light transmitted through the central part cannot be improved.

Preferably, in the second lens, the film thickness of the second anti-reflection film formed on the second light incident side lens surface is set so that a wavelength $\lambda 8$ at which the reflectance of the light entering the peripheral part having the angle $\theta$ of 45 degrees, of the second light incident side lens surface at the angle of zero degrees has a local minimum value, satisfies 345 nm$\leq \lambda 8 \leq$490 nm.

In this case, since the wavelength $\lambda 8$ at which the reflectance of the light entering the peripheral part of the second light incident side lens surface at the angle of zero degrees has the local minimum value, satisfies 345 nm$\leq \lambda 8 \leq$490 nm, and is substantially equal to the wavelength $\lambda 1$ of the laser light source within the range from 400 nm to 440 nm. Consequently, it can be suppressed that the quantity of the light through the peripheral part having the relatively large angle $\theta$, of the second light incident side lens surface becomes relatively too small in comparison with the quantity of the light transmitted through the central part of the lens surface. The balance between the quantity of the light transmitted through the peripheral part and the quantity of the light transmitted through the central part can be improved more than a lens according to an earlier development. Hence, the loss of a beam spot shape can be securely prevented, and a spot diameter can be reduced in a good balance. Furthermore, a transmitted light quantity can be secured.

Preferably, in the first lens, a third anti-reflection film is formed on a first light emergent side lens surface disposed on a side of an emergence of the light from the first lens, and a film thickness of the third anti-reflection film is set so that a wavelength $\lambda 9$ at which a reflectance of the light entering a central part having the angle $\theta$ of zero degrees, of the first light emergent side lens surface at an angle of zero degrees has a local minimum value, satisfies 380 nm$\leq \lambda 9 \leq$500 nm; and in the second lens, a fourth anti-reflection film is formed on the second light emergent side lens surface disposed on a side of an emitting the light from the second lens, and a film thickness of the fourth anti-reflection film is set so that a wavelength $\lambda 10$ at which a reflectance of the light entering a central part having the angle $\theta$ of zero degrees, of the second light emergent side lens surface at an angle of zero degrees has a local minimum value, satisfies 380 nm$\leq \lambda 10 \leq$500 nm.

Hereupon, it is more preferable to set the film thickness of the first anti-reflection film formed on the first light emergent side lens surface of the first lens so that the wavelength $\lambda 9$ at which the reflectance of the light entering the central part having the angle $\theta$ of zero degrees, of the light emergent side lens surface at the angle of zero degrees has a local minimum value, satisfies 400 nm$\leq \lambda 4 \leq$480 nm.

Moreover, it is more preferable to set the film thickness of the fourth anti-reflection film formed on the second light emergent side lens surface of the second lens so that the wavelength $\lambda 10$ at which the reflectance of the light entering the central part having the angle $\theta$ of zero degrees, of the second light emergent side lens surface at the angle of zero degrees has a local minimum value, satisfies 390 nm$\leq \lambda 10 \leq$480 nm.

In this case, since the wavelengths $\lambda 9$ and $\lambda 10$ at which each reflectance of the light entering each central part of the first light emergent side lens surface and the second light emergent side lens surface at the angle of zero degrees has the local minimum value satisfy 380 nm$\leq \lambda 9 \leq$500 nm and 380 nm$\leq \lambda 10 \leq$500 nm, respectively, the balance between the quantity of the light transmitted through the peripheral part and the quantity of the light transmitted through the central part is improved. Therefore, it is possible to achieve the reduction in a beam spot diameter and the increase in a transmitted light quantity by the anti-reflection film formed on the first light emergent side lens surface and the anti-reflection film formed on the second light emergent lens side surface.

Preferably, in the first lens, the film thickness of the first anti-reflection film formed on the first light incident side lens surface is set so that the wavelength $\lambda 5$ at which the reflectance of the light entering the central part having the angle $\theta$ of zero degrees, of the first light incident side lens surface at the angle of zero degrees has a local minimum value, satisfies 420 nm$\leq \lambda 5 \leq$480 nm.

In this case, since the wavelength $\lambda 5$ at which the reflectance of the light entering the central part having the angle $\theta$ of zero degrees, of the first light incident side lens surfaces at the angle of zero degrees has the local minimum value, satisfies 420 nm$\leq \lambda 5 \leq$480 nm, the balance between the quantity of the light transmitted through the peripheral part and the quantity of the light transmitted through the central part can be improved. Consequently, it is possible to reduce a beam spot diameter and increase a transmitted light quantity.

Incidentally, it is preferable that the wavelength range of the laser light source is within the range from 400 nm to 420 nm. It is more preferable that the wavelength is a general wavelength, that is, 405±5 nm. In this case, it is possible to securely reduce a beam spot diameter and increase a transmitted light quantity.

Preferably, in the first lens, the film thickness of the first anti-reflection film formed on the first light incident side lens surface is set so that a wavelength $\lambda6$ at which the reflectance of the light entering the peripheral part having the angle $\theta$ of 30 degrees, of the first light incident side lens surface at the angle of zero degrees has a local minimum value, satisfies 380 nm$\leq\lambda6\leq$440 nm.

In this case, the wavelength $\lambda6$ at which the reflectance of the light entering the peripheral part of the first light incident side lens surface at the angle of zero degrees has the local minimum value, satisfies 380 nm$\leq\lambda6\leq$440 nm, it can be suppressed that the quantity of the light through the peripheral part having the relatively large angle $\theta$, of the first light incident side lens surface becomes relatively too small in comparison with the quantity of the light transmitted through the central part of the lens surface. Hence, the loss of a beam spot shape can be securely prevented, and a spot diameter can be reduced in a good balance. Furthermore, a transmitted light quantity can be secured.

Preferably, in the second lens, the film thickness of the second anti-reflection film formed on the second light incident side lens surface is set so that a wavelength $\lambda7$ at which the reflectance of the light entering the central part having the angle $\theta$ of zero degrees, of the second light incident side lens surface at the angle of zero degrees has a local minimum value, satisfies 430 nm$\leq\lambda7\leq$480 nm.

In this case, since the wavelength $\lambda7$ at which the reflectance of the light entering the central part having the angle $\theta$ of zero degrees, of the second light incident side lens surfaces at the angle of zero degrees has the local minimum value, satisfies 430 nm$\leq\lambda7\leq$480 nm, the balance between the quantity of the light transmitted through the peripheral part and the quantity of the light transmitted through the central part can be improved. Consequently, it is possible to reduce a beam spot diameter and increase a transmitted light quantity.

Incidentally, it is preferable that the wavelength range of the laser light source is within the range from 400 nm to 420 nm. It is more preferable that the wavelength is a general wavelength, that is, 405+5 nm. In this case, it is possible to securely reduce a beam spot diameter and increase a transmitted light quantity.

Preferably, in the second lens, the film thickness of the second anti-reflection film formed on the second light incident side lens surface is set so that a wavelength $\lambda8$ at which the reflectance of the light entering the peripheral part having the angle $\theta$ of 45 degrees, of the second light incident side lens surface at the angle of zero degrees has a local minimum value, satisfies 357 nm$\leq\lambda8\leq$400 nm.

In this case, since the wavelength $\lambda8$ at which the reflectance of the light entering the peripheral part of the second light incident side lens surfaces at the angle of zero degrees has the local minimum value, satisfies 357 nm$\leq\lambda8\leq$400 nm, it can be suppressed that the quantity of the light through the peripheral part having the relatively large angle $\theta$, of the second light incident side lens surface becomes relatively too small in comparison with the quantity of the light transmitted through the central part of the lens surface Hence, the loss of a beam spot shape can be securely prevented, and a spot diameter can be reduced in a good balance. Furthermore, a transmitted light quantity can be secured.

According to a third aspect of the present invention, An optical lens for condensing a light emitted from a laser light source on an optical recording medium, the light having at least one kind of a wavelength $\lambda11$ within a wavelength range from 630 nm to 680 nm, the optical lens being mounted in an optical information recording and reproducing apparatus capable of executing at least either a record of information on the optical recording medium or a reproduction of information recorded on the optical recording medium by condensing the light on the optical recording medium, comprises:

a light incident side lens surface disposed on a side which the light emitted from the laser light source enters, the light incident side lens surface comprising a peripheral part having an angle $\theta$ of 45 degrees or more, where the $\theta$ is an angle formed by a normal line at a position on each lens surface and an optical axis; and a first anti-reflection film formed on the light incident side lens surface, the first anti-reflection film having a film thickness which is set so that a wavelength $\lambda12$ at which a reflectance of the light entering a central part of the light incident side lens surface at an angle of zero degrees has a local minimum value, satisfies $\lambda11<\lambda12$ and 680 nm$\leq\lambda12\leq$870 nm, the central part having the angle $\theta$ of zero degrees.

Hereupon, it is more preferable to set the film thickness of the anti-reflection film formed on the light incident side lens surface so that the wavelength $\lambda12$ at which the reflectance of the light entering the central part having the angle $\theta$ of zero degrees, of the light incident side lens surface has a local minimum value, satisfies 710 nm$\leq\lambda12\leq$850 nm.

According to the third aspect of the invention, since the wavelength $\lambda12$ at which the reflectance of the light entering the central part of the light incident side lens surface at the angle of zero degrees has the local minimum value, satisfies $\lambda11<\lambda12$ and 680 nm$\leq\lambda12\leq$870 nm, the reflectance of the light entering the central part which occupies a large area of the light incident side lens surface is lowered. The peripheral part transmits the light relatively more than the central part of the light incident side lens surface. Further, the balance between the quantity of the light transmitted through the peripheral part and the quantity of the light transmitted through the central part is improved more than a lens according to an earlier development. Therefore, it is possible to achieve the reduction in a beam spot diameter and the increase in a transmitted light quantity. That is, the performance of an optical lens to be used for optical information recording and reproducing using a laser beam of the wavelength from 630 nm to 680 nm can be more improved, and a high NA optical lens having a good light condensing performance can be provided.

In this case, the wavelength $\lambda12$ is set to 870 nm or less. When the wavelength $\lambda12$ is longer than 870 nm, the quantity of the light which is transmitted through the central part becomes relatively too little in comparison with the quantity of the light which is transmitted through the peripheral part. Therefore, there is a problem that the crosstalk is caused because a beam spot shape is lost.

Further, the wavelength $\lambda12$ is set to 630 nm or more. When the wavelength $\lambda12$ is shorter than 630 nm, the quantity of the light which is transmitted through the peripheral part does not become large. Therefore, the balance between the quantity of the light transmitted through the peripheral part and the quantity of the light transmitted through the central part cannot be improved.

Incidentally, when the light incident side lens surface includes a part having the angle θ of 53 degrees or more in the effective diameter thereof, the quantity of the light which is transmitted through the peripheral part having a larger angle θ, can be secured. Consequently, it is possible to contribute to the further reduction in a spot diameter.

Preferably, the optical lens further comprises a light emergent side lens surface disposed on a side of emitting the light, the light emergent lens surface comprising a second anti-reflection film formed thereon, wherein the second anti-reflection film has a film thickness which is set so that a wavelength λ13 at which a reflectance of the light entering a central part having the angle θ of zero degrees, of the light emergent side lens surface at the angle of zero degrees has a local minimum value, satisfies 650 nm≦λ13≦800 nm.

Hereupon, it is more preferable to set the film thickness of the anti-reflection film formed on the light emergent side lens surface so that the wavelength λ13 at which the reflectance of the light entering the central part having the angle θ of zero degrees, of the light emergent side lens surface at the angle of zero degrees has a local minimum value, satisfies 680 nm≦λ13≦790 nm.

In this case, since the wavelength λ13 at which the reflectance of the light entering the central part of the light emergent side lens surface at the angle of zero degrees has the local minimum value satisfies 650 nm≦λ13≦800 nm, the balance between the quantity of the light transmitted through the peripheral part and the quantity of the light transmitted through the central part is improved. Therefore, it is possible to achieve the reduction in a beam spot diameter and the increase in a transmitted light quantity by the anti-reflection film formed on the light incident side lens surface and the anti-reflection film formed on the light emergent lens side surface.

Preferably, the film thickness of the first anti-reflection film formed on the light incident side lens surface is set so that a wavelength λ14 at which the reflectance of the light entering the peripheral part having the angle θ of 45 degrees, of the light incident side lens surface at the angle of zero degrees has a local minimum value, satisfies 560 nm≦λ14≦722 nm.

In this case, since the wavelength λ14 at which the reflectance of the light entering at the peripheral part of the light incident side lens surface at the angle of zero degrees has the local minimum value, satisfies 560 nm≦λ14≦722 nm, and is substantially equal to the wavelength λ11 of the laser light source within the range from 630 nm to 680 nm. Consequently, it can be suppressed that the quantity of the light through the peripheral part having the relatively large angle θ, of the light incident side lens surface becomes relatively too small in comparison with the quantity of the light transmitted through the central part of the lens surface. The balance between the quantity of the light transmitted through the peripheral part and the quantity of the light transmitted through the central part can be improved more than a lens according to an earlier development. Hence, the loss of a beam spot shape can be securely prevented, and a spot diameter can be reduced in a good balance. Furthermore, a transmitted light quantity can be secured.

Preferably, the film thickness of the first anti-reflection film formed on the light incident side lens surface is set so that the wavelength λ12 at which the reflectance of the light entering the central part having the angle θ of zero degrees, of the light incident side lens surface at the angle of zero degrees has a local minimum value, satisfies 710 nm≦λ12≦850 nm, and so that a wavelength λ14 at which a reflectance of the light entering the peripheral part having the angle θ of 45 degrees, of the light incident side lens surface at the angle of zero degrees has a local minimum value, satisfies 580 nm≦λ14≦705 nm; and a film thickness of a second anti-reflection film formed on the light emergent side lens surface on the side of an emergence of the light from the optical lens is set so that a wavelength λ13 at which the reflectance of the light entering the central part having the angle θ of zero degrees, of the light emergent side lens surface at the angle of zero degrees has a local minimum value, satisfies 670 nm≦λ13≦800 nm.

In this case, since the wavelength λ12 at which the reflectance of the light entering the central part having the angle θ of zero degrees, of the second light incident side lens surfaces at the angle of zero degrees has the local minimum value, satisfies 710 nm≦λ12≦850 nm, the balance between the quantity of the light transmitted through the peripheral part and the quantity of the light transmitted through the central part can be improved.

Since the wavelength λ14 at which the reflectance of the light entering the peripheral part of the light incident side lens surface at the angle of zero degrees has the local minimum value, satisfies 580 nm≦λ14≦705 nm, and is substantially equal to the wavelength λ11 of the laser light source within the range from 630 nm to 680 nm. Consequently, it can be suppressed that the quantity of the light through the peripheral part having the relatively large angle θ, of the light incident side lens surface becomes relatively too small in comparison with the quantity of the light transmitted through the central part of the lens surface. The balance between the quantity of the light transmitted through the peripheral part and the quantity of the light transmitted through the central part can be improved more than a lens according to an earlier development.

Further, since the wavelength λ13 at which the reflectance of the light entering each central part of the light emergent side lens surface at the angle of zero degrees has the local minimum value satisfies 670 nm≦λ13≦800 nm, the balance between the quantity of the light transmitted through the peripheral part and the quantity of the light transmitted through the central part is improved.

As described above, it is possible to achieve the reduction in a beam spot diameter and the increase in a transmitted light quantity.

Preferably, the optical lens condenses a first light emitted from a first laser light source on a first optical recording medium, and a second light emitted from a second laser light source on a second optical recording medium, respectively, the first light having at least one kind of the wavelength λ11 within the wavelength range from 630 nm to 680 nm, and the second light having at least one kind of a wavelength λ15 within a wavelength range from 770 nm to 790 nm.

The first laser light source emitting the light having a wavelength within the range 630 nm to 680 nm is used for the optical information record and reproduction for DVD. The second laser light source emitting the light having a wavelength within the range 770 nm to 790 nm is used for the optical information record and reproduction for CD.

In this case, it is more preferable that the optical lens condenses a first light emitted from a first laser light source on a first optical recording medium, and a second light emitted from a second laser light source on a second optical recording medium, respectively, the first light having at least one kind of the wavelength λ11 within the wavelength range from 630 nm to 670 nm, and the second light having at least one kind of a wavelength $\lambda15$ within a wavelength range from 780 nm to 790 nm.

In this case, since the optical lens condenses the light emitted from the first laser light source used for the optical information record and reproduction for DVD and the light emitted from the second laser light source used for the optical information record and reproduction for CD, respectively, it is possible to optimize both the reduction in the spot diameter and the transmitted light quantity during the optical information record and reproduction for DVD and CD. Therefore, an optical lens to be used for the optical information record and reproduction for both DVD and CD can have a higher performance.

Preferably, the film thickness of the first anti-reflection film formed on the light incident side lens surface is set so that the wavelength $\lambda12$ at which the reflectance of the light entering the central part having the angle $\theta$ of zero degrees, of the light incident side lens surface at the angle of zero degrees has a local minimum value, satisfies 710 nm$\leq\lambda12\leq$790 nm; and a film thickness of a second anti-reflection film formed on the light emergent side lens surface disposed on a side of an emergence of the light from the optical lens, is set so that a wavelength $\lambda13$ at which the reflectance of the light entering the central part having the angle $\theta$ of zero degrees, of the light emergent side lens surface at the angle of zero degrees has a local minimum value, satisfies 710 nm$\leq\lambda13\leq$790 nm.

In this case, since the wavelength $\lambda12$ at which the reflectance of the light entering the central part having the angle $\theta$ of zero degrees, of the light incident side lens surfaces at the angle of zero degrees has the local minimum value, satisfies 710 nm$\leq\lambda12\leq$790 nm, the balance between the quantity of the light transmitted through the peripheral part and the quantity of the light transmitted through the central part can be improved. Consequently, it is possible to reduce a beam spot diameter and increase a transmitted light quantity.

In this case, since the wavelength $\lambda13$ at which the reflectance of the light entering the central part having the angle $\theta$ of zero degrees, of the light emergent side lens surface at the angle of zero degrees has the local minimum value satisfies 710 nm$\leq\lambda13\leq$790 nm, the balance between the quantity of the light transmitted through the peripheral part and the quantity of the light transmitted through the central part is improved. Therefore, it is possible to achieve the reduction in a beam spot diameter and the increase in a transmitted light quantity by the anti-reflection film formed on the light incident side lens surface and the anti-reflection film formed on the light emergent lens side surface.

Incidentally, it is preferable that the wavelength range of the laser light source is within the range from 630 nm to 655 nm.

Preferably, the film thickness of the anti-reflection film formed on the light incident side lens surface is set so that the wavelength $\lambda14$ at which the reflectance of the light entering the peripheral part having the angle $\theta$ of 45 degrees, of the light incident side lens surface at the angle of zero degrees has a local minimum value, satisfies 590 nm$\leq\lambda14\leq$660 nm.

In this case, since the wavelength $\lambda14$ at which the reflectance of the light entering the peripheral part of the light incident side lens surface at the angle of zero degrees has the local minimum value, satisfies 590 nm$\leq\lambda14\leq$660 nm, and is substantially equal to the wavelength $\lambda11$ of the laser light source within the range from 630 nm to 680 nm. Consequently, it can be suppressed that the quantity of the light through the peripheral part having the relatively large angle $\theta$, of the light incident side lens surface becomes relatively too small in comparison with the quantity of the light transmitted through the central part of the lens surface. The balance between the quantity of the light transmitted through the peripheral part and the quantity of the light transmitted through the central part can be improved more than a lens according to an earlier development. Hence, the loss of a beam spot shape can be securely prevented, and a spot diameter can be reduced in a good balance. Furthermore, a transmitted light quantity can be secured.

Preferably, the anti-reflection coat is formed by one of a vacuum evaporation method, a sputtering method, a spinning coating method, a dipping coating method, a CVD method and an atmospheric pressure plasma method.

In this case, since a film can be formed without contacting a lens surface with liquid, bad external appearances, such as nonuniformity caused by drying, liquid dropping, coating or the like can be prevented.

Incidentally, it is preferable to adopt the vacuum evaporation method, the sputtering method, the CVD method and the atmospheric pressure plasma method among the methods mentioned above. In this case, it is possible to form a film having a high accuracy of a film thickness and a stable refractive index. Consequently, it is possible to realize the formation of a film having a superior optical performances on a lens surface.

Preferably, the anti-reflection coat is made of one of a high refractive index material, an intermediate refractive index material and a low refractive index material.

Hereupon, as the high refractive index material, there are cerium oxide, titanium oxide, tantalum oxide, zirconium oxide, hafnium oxide, tungstic oxide, chromium oxide, silicon nitride, oxygen-bearing silicon nitride, carbon-bearing silicon nitride and the like.

Moreover, as the intermediate refractive index material, there are aluminum oxide, yttrium oxide, lead fluoride, cerium fluoride and the like.

Moreover, as the low refractive index material, there are silicon oxide, magnesium fluoride, aluminum fluoride, cryolite and the like.

In this case, an anti-reflection film having high transparency and a stable refractive index can be obtained.

Incidentally, with respect to the above-described materials, one of the materials may be used independently. Two or more materials may be used in a mixed state or a compound state.

According to a fourth aspect of the present invention, an optical information recording and reproducing apparatus comprising a laser light source and the above-described optical lens, wherein the apparatus executes at least either a record of information on an optical recording medium or a reproduction of information recorded on the optical recording medium by condensing a light emitted from the laser light source with the optical lens.

According to the fourth aspect of the invention, since the light emitted from the laser light source is condensed on the optical recording medium by the optical lens, it is possible to achieve the reduction in a beam spot diameter and the increase in a transmitted light quantity. Consequently, as compared with an earlier development, it is possible to record information on the optical recording medium at a higher density, and to reproduce information from the optical recording medium in which the information is recorded at a higher density. Therefore, it is possible to realize the increase in the capacity of the optical recording medium.

BRIEF DESCRIPTION OF THE DRAWINGS

FIG. 5 is a table showing layer configurations of anti-reflection coats applied to the lens of the first embodiment, and wavelengths at which the reflectance of light has the local minimum value;

FIGS. 6A and 6B are tables showing transmittance of light of the lens according to the first embodiment, on which the anti-reflection coats having the layer configurations shown in FIG. 5 are formed, and evaluations of the transmittance and beam spot shapes;

FIGS. 8A and 8B are tables showing layer configurations of anti-reflection coats applied to lenses according to the second and the third embodiments, and wavelengths at which the reflectance of light has the local minimum value;

FIGS. 9A and 9B are tables showing transmittance of light of the lenses according to the second embodiment, on which the anti-reflection coats having the layer configurations shown in FIGS. 8A and 8B are formed, and evaluations of the transmittance and beam spot shapes;

FIGS. 10A and 10B are tables showing transmittance of light of first lenses of the optical lenses according to the third embodiment, on which the anti-reflection coats having the layer configurations shown in FIGS. 8A and 8B are formed, and evaluations of the transmittance and beam spot shapes;

FIGS. 11A and 11B are tables showing transmittance of light of second lenses of the optical lenses according to the third embodiment, on which the anti-reflection coats having the layer configurations shown in FIGS. 8A and 8B are formed, and evaluations of the transmittance and beam spot shapes.

DETAILED DESCRIPTION OF THE PREFERRED EMBODIMENTS

In the following, the preferred embodiments of the present invention are explained with reference to the attached drawings.

First Embodiment

A lens 1 (shown in FIG. 1) according to a first embodiment of the optical lens of the present invention is used as an object lens of an optical pickup apparatus (optical information recording and reproducing apparatus) capable of executing the recording of information to an optical recording medium, and the reproducing of the information recorded on the optical recording medium.

Figure 3:
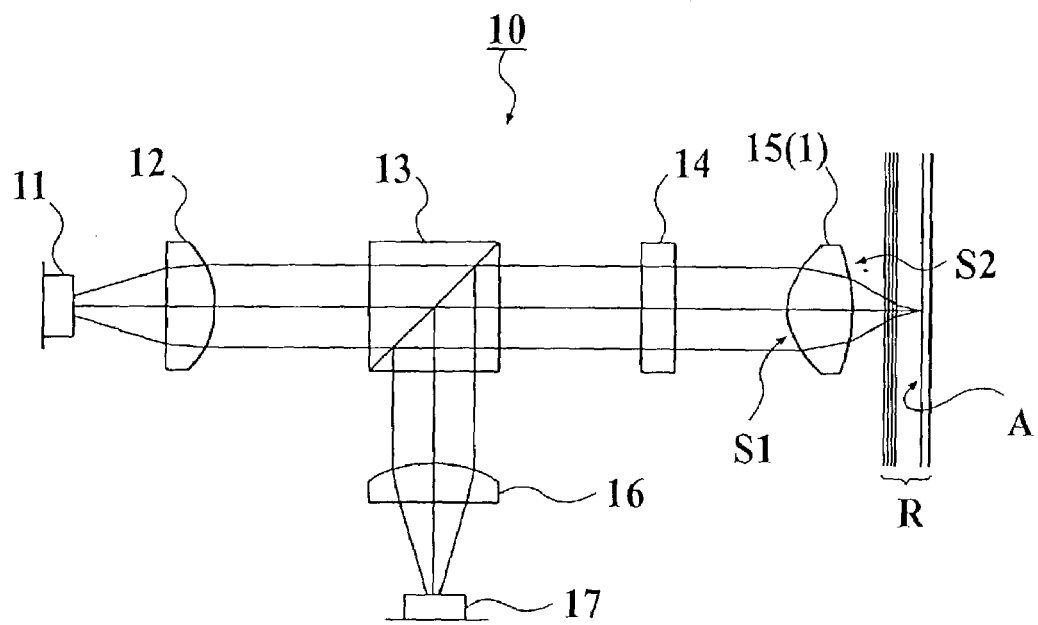
FIG. 3 is a schematic view showing an optical pickup apparatus equipped with the lens shown in FIG. 1.

An optical pickup apparatus 10 shown in FIG. 3 is configured to be applicable to two kinds of optical recording media which are a DVD and a CD. The optical pickup apparatus 10 comprises a semiconductor laser light source 11 equipped with a semiconductor laser emitting a light having a wavelength $\lambda 11$ within the range from 630 nm to 680 nm and a semiconductor laser emitting a light having a wavelength $\lambda 15$ within the range from 770 nm to 790 nm, a collimator lens 12, a polarization beam splitter 13, a quarter wave plate 14, an object lens 15 (a lens similar to the lens 1 mentioned above), a convex lens 16 and a photo-detector 17. The lens 1 (the object lens 15) is incorporated in the optical pickup apparatus 10 in the state in which a lens surface (a light incident side lens surface) S1 having a curvature larger than that of the other lens surface (a light emergent side lens surface) S2 among the two lens surfaces S1 and S2 is directed to the side of the semiconductor laser light source 11.

A laser beam emitted from the semiconductor laser emitting a light having the wavelength $\lambda 11$ within the range of 630 nm to 680 nm or the semiconductor laser emitting a light having the wavelength $\lambda 15$ within the range of 770 nm to 790 nm of the semiconductor laser light source 11 is converted to parallel rays by the collimator lens 12. Then, only the rays of P components are transmitted by the polarization beam splitter 13, and are converted to linearly polarized light (P polarized light).

The P polarized light is converted to right-handed circularly polarized light by the quarter wave plate 14. The circularly polarized light then enters the object lens 15 (the lens 1) from the side of the lens surface S1, and emerges from the side of the lens surface S2 thereof. Then, the emergent circularly polarized light is condensed on an information recording surface A of an optical recording medium R (a DVD or a CD).

The circularly polarized light reflected on the information recording surface A of the optical recording medium R is converted to a circularly polarized light having a reverse rotational direction (left-handed circularly polarized light), and is again transmitted through the object lens 15. Then, the transmitted polarized light is converted to linearly polarized light having only S components (S polarized light) by the quarter wave plate 14.

The S polarized light is totally reflected by the polarization beam splitter 13, and is condensed on the photo-detector 17 by the convex lens 16.

In the optical pickup apparatus 10, the information recorded on the information recording surface A of the optical recording medium R can be read by detecting the quantity of optical feedback with the photo-detector 17 to reproduce the information. Moreover, in a configuration in which, for example, a dye layer or the like is formed on the upper surface of the information recording surface A of the optical recording medium R, it is possible to record information on the information recording surface A by condensing a high energy laser beam with the object lens 15.

Figure 1:
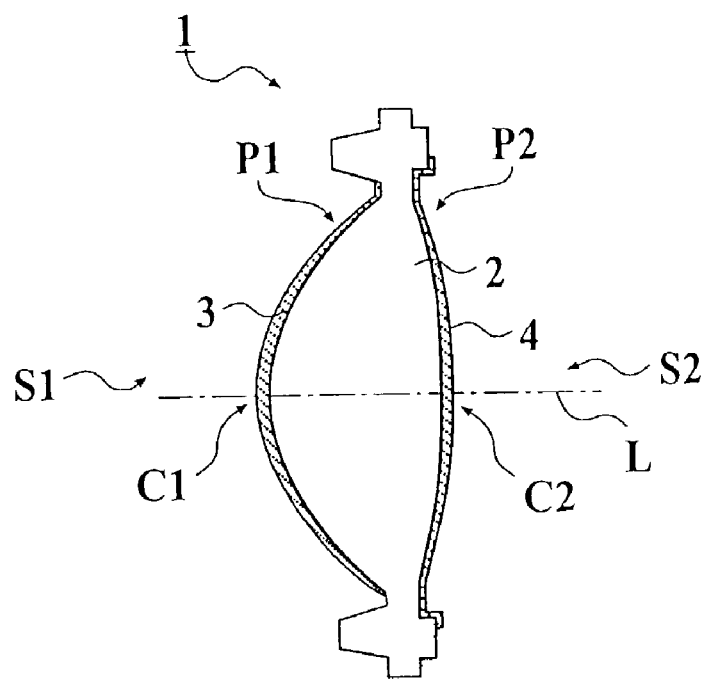
FIG. 1 is a schematic longitudinal section showing a lens of a first embodiment.

As shown in FIG. 1, the lens 1 comprises a base material 2, and anti-reflection coats (anti-reflection films) 3 and 4 formed on the lens surfaces S1 and S2, respectively.

In a peripheral part P1 of the lens surface S1, a surface on which an angle θ (not shown) formed by the normal line at one position on the lens surface S1 and an optical axis L is 45 degrees or more is included.

The base material 2 is made of, for example, a plastic material, a glass material, a composite of these materials, and the like. The plastic material is concretely made of a transparent resin material such as an acrylic resin, a polycarbonate resin, a polyolefin resin (Zeonex (registered trade mark) by Zeon Corporation, and the like), a cyclic olefin copolymer resin and the like. Moreover, as the glass material mentioned above, a known optical glass is used.

The base material 2 is produced by processing it in a lens form by means of the injection molding of a plastic material, glass mold forming, polishing process, grinding process and the like.

Incidentally, the lens 1 may be configured to include a surface processed layer such as a protection layer, an under coating layer and the like between the base material 2 and the anti-reflection coats 3 and 4, although it is not shown in FIG. 1. As the protection layer, for example, there is a water repellent layer containing silicon or fluorine. By the water repellent protection layer, it is possible to prevent the adhesion of dirt. Alternatively, as the under coating layer, there is a layer made of a silicon oxide layer having a thickness within a range from several nanometer to several tens micrometer or a layer made of an ultraviolet curing resin or a thermosetting resin. Thereby, it becomes possible to improve the film coating and the abrasion resistance of the anti-reflection coats 3 and 4.

Figure 2:
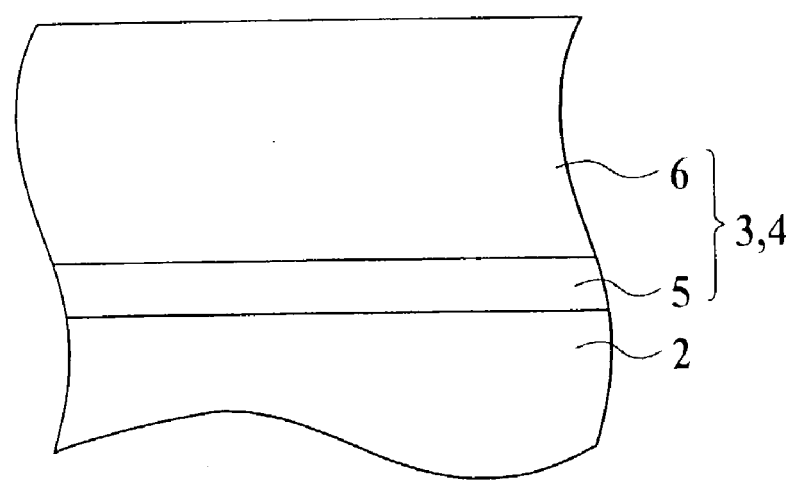
FIG. 2 is a sectional view of an enlarged part of the lens shown in FIG. 1.

It is preferably that the anti-reflection coats 3 and 4 are deposited in a laminated state, for example, by the technique disclosed in Japanese Patent Laid-Open Publication No. Hei 10-160906. The anti-reflection coats 3 and 4 may be deposited in a laminated state by a well-known deposition method, such as the vacuum deposition method, the sputtering process, the CVD method, the atmospheric pressure plasma method (disclosed in Japanese Patent Laid-Open Publication No. 2001-100008, and Japanese Patent Laid Open Publication No. 2000-147209) and the like. As shown in FIG. 2, the anti-reflection coats 3 and 4 comprises a first layer 5 formed on the base material 2 and a second layer 6 formed on the first layer 5. The first layer 5 is made of a material having a refractive index higher than that of the material of the second layer 6.

To put it concretely, as the high refractive index material constituting the first layer 5, for example, cerium oxide, titanium oxide, tantalum oxide, zirconium oxide, aluminum oxide, silicon nitride, oxygen-bearing silicon nitride and the like can be used. As a material having an intermediate refractive index, for example, aluminum oxide, yttrium oxide, lead fluoride, cerium fluoride and the like can be used. Moreover, as the low refractive index material constituting the second layer 6, for example, silicon oxide, magnesium fluoride, aluminum fluoride, cryolite and the like can be used.

Hereupon, the first layer 5 and the second layer 6 may be made of one kind of the high refractive index material, the intermediate refractive index material and the low refractive index material, and may be made of a mixture of a plurality of kinds of the materials.

In the lens 1 shown in FIG. 1, the lens surface S1 is formed in order that the film thickness of the anti-reflection coat 3 may become thinner as a position on the surface S1 moves from the central part C1 to the peripheral part P1. Moreover, the lens surface S2 is formed in order that the film thickness of the anti-reflection coat 4 may become thinner as a position on the surface S2 moves from the central part C2 to a peripheral part P2.

The film thickness of the anti-reflection coat 3 is set in order that the wavelength $\lambda 12$ at which the reflectance of the light entering the central part C1 having the angle $\theta$ of zero degrees, of the lens surface S1 at the angle of zero degrees has a local minimum value, satisfies $\lambda 11 < \lambda 12$ and 680 nm$\leq \lambda 12 \leq$870 nm. Incidentally, it is more preferable that the film thickness of the anti-reflection coat 3 is set in order that the wavelength $\lambda 12$ satisfies 710 nm$\leq \lambda 12 \leq$850 nm.

Moreover, the film thickness of the anti-reflection coat 4 is set in order that the wavelength $\lambda 13$ at which the reflectance of the light entering the central part C2 having the angle $\theta$ of zero degrees, of the lens surface S2 at the angle of zero degrees has a local minimum value, satisfies 650 nm$\leq \lambda 13 \leq$800 nm. Incidentally, it is more preferable that the film thickness of the anti-reflection coat 4 is set in order that the wavelength $\lambda 13$ satisfies 680 nm$\leq \lambda 13 \leq$790 nm.

Moreover, the film thickness of the anti-reflection coat 3 is set in order that the wavelength $\lambda 14$ at which the reflectance of the light entering the peripheral part P1 having the angle $\theta$ of 45 degrees, of the lens surface S1 at the angle of zero degrees, that is, the reflectance of the light entering the peripheral part P1 so as to be perpendicular to the lens surface S1, has a local minimum value, satisfies 560 nm$\leq \lambda 14 \leq$722 nm. Incidentally, it is more preferable that the film thickness of the anti-reflection coat 3 is set in order that the wavelength $\lambda 14$ satisfies 580 nm$\leq \lambda 14 \leq$705 nm.

Hereupon, when at least one kind of the wavelength $\lambda 11$ of the semiconductor laser mounted in the semiconductor laser light source 11 of the optical pickup apparatus 10 is within the range from 650 nm to 670 nm, it is preferable that the film thickness of the anti-reflection coat 3 is set in order that the wavelength $\lambda 12$ at which the reflectance of the light entering the central part C1 having the angle $\theta$ of zero degrees, of the lens surface S1 at the angle of zero degrees has the local minimum value, satisfies 700 nm$\leq \lambda 12 \leq$850 nm.

Moreover, it is preferable that the film thickness of the anti-reflection coat 3 is set in order that the wavelength $\lambda 14$ at which the reflectance of the light entering the peripheral part P1 having the angle $\theta$ of 45 degrees, of the lens surface S1 at the angle of zero degrees has the local minimum value, satisfies 580 nm$\leq \lambda 14 \leq$705 nm.

Moreover, it is preferable that the film thickness of the anti-reflection coat 4 is set in order that the wavelength $\lambda 13$ at which the reflectance of the light entering the central part C2 having the angle $\theta$ of zero degrees, of the lens surface S2 at the angle of zero degrees has a local minimum value, satisfies 670 nm$\leq \lambda 13 \leq$800 nm.

As described above, in the lens 1 of the first embodiment, the wavelength $\lambda 12$ at which the reflectance of the light entering the central part C1 of the lens surface S1 has the local minimum value, is on a longer wavelength side than the wavelength $\lambda 11$ of the laser beam source from 630 nm to 680 nm.

Moreover, since the incident angle of light in the peripheral part P1 is larger than that in the central part C1, the wavelength $\lambda 14$ at which the reflectance of light has the local minimum value in the peripheral part P1 is on the shorter wavelength side than the wavelength $\lambda 12$ at which the reflectance of light has the local minimum value in the central part C1.

Therefore, the peripheral part P1 transmits the light emitted from the semiconductor laser having the wavelength range from 630 nm to 680 nm relatively more than the central part C1. Consequently, it is possible to achieve the reduction in the diameter of a beam spot shape and the increase in the quantity of the transmitted light in the light information recording and reproducing of a DVD, which is carried out by using the laser beam having the wavelength range from 630 nm to 680 nm.

On the other hand, when the wavelength $\lambda 12$ at which the reflectance of the light entering the central part C1 has the local minimum value is larger than 870 nm, the transmittance of the light at the central part C1 becomes too low. Further, the quantity of the light transmitted through the central part C1 becomes too small in comparison with the quantity of the light transmitted through the peripheral part P1. Consequently, a beam spot shape is lost and problems of crosstalk and the like are caused.

On the contrary, in the lens 1 of the first embodiment, since the wavelength $\lambda 12$ at which the reflectance of the light entering the central part C1 has the local minimum value is 870 nm or less, it is possible to suppress that the quantity of the light which is transmitted through the central part C1 becomes too small. Consequently, the beam spot shape can be prevented from being lost, and the diameter of the spot shape can be reduced in a good balance. Furthermore, a sufficient transmitted light quantity can be secured.

Moreover, since the wavelength $\lambda 13$ at which the reflectance of the light entering the central part C2 of the lens surface S2 has the local minimum value satisfies $650 \text{ nm} \leq \lambda 13 \leq 800 \text{ nm}$, the balance between the quantity of the light transmitted through the peripheral part P2 and the quantity of the light transmitted through the central part C2 is improved. Therefore, it is possible to achieve the reduction in a beam spot diameter and the increase in a transmitted light quantity.

Moreover, when the film thicknesses of the anti-reflection coats 3 and 4 are set in order that the wavelength $\lambda 12$ at which the reflectance of the light entering the central parts C1 and C2 having the angle θ of zero degrees or the peripheral part P1 having the angle θ of 45 degrees or more, at the angle of zero degrees, for the anti-reflection coats 3 and 4 has the local minimum values is in each predetermined wavelength range described above, it becomes possible to realize the reduction in the diameter of a beam spot shape and the increase in the quantity of the transmitted light in a better balanced state.

Moreover, since the film thickness of the anti-reflection coat 3 is set in order that the wavelength $\lambda 12$ at which the reflectance of the light entering the central part C1 of the lens surface S1 at the angle of zero degrees has the local minimum value, satisfies $680 \text{ nm} \leq \lambda 12 \leq 870 \text{ nm}$, it is possible to obtain a desirable beam spot shape and a desirable transmitted light quantity in the light information recording and reproducing for a CD, which is carried out by using the laser beam having a wavelength within the range from 770 nm to 790 nm.

Moreover, when the film thicknesses of the anti-reflection coats 3 and 4 are set in order that the wavelength $\lambda 12$ at which the reflectance of the light entering the central part C1 of the lens surface S1 at the angle of zero degrees has the local minimum value, satisfies $710 \text{ nm} \leq \lambda 12 \leq 790 \text{ nm}$, and that the wavelength $\lambda 13$ at which the reflectance of the light entering the central part C2 of the lens surface S2 at the angle of zero degrees has the local minimum value, satisfies $710 \text{ nm} \leq \lambda 13 \leq 790 \text{ nm}$, it becomes possible to obtain a desirable beam spot shape and a desirable transmitted light quantity in a stable state.

Moreover, in this case, the film thickness of the anti-reflection coat 3 formed on the light incident side lens surface S1 is set in order that the wavelength $\lambda 14$ at which the reflectance of the light entering the peripheral part P1 having the angle θ of 45 degrees, of the lens surface S1 at the angle of zero degrees has the local minimum value, satisfies $590 \text{ nm} \leq \lambda 14 \leq 660 \text{ nm}$. Consequently, in the optical pickup apparatus 10 executing the light information recording and reproducing for both of the optical recording media R which are a DVD and a CD, the recording and reproducing for the DVD and the CD can be performed in a good condition.

Moreover, the peripheral part P1 having a larger curvature, of the lens surface S1 includes a surface that the angle θ is 45 degree. Consequently, in a high NA optical lens having a lens surface that the angle θ is relatively large, the light condensing performance of the lens can be further improved. Thereby, it is possible to contributable to the realization of the increase in the capacity of an optical recording medium.

Moreover, according to the optical pickup apparatus 10 equipped with the lens 1, since the light emitted from the semiconductor laser light source 11 is condensed on an optical recording medium by the lens 1, it is possible to achieve the reduction in a beam spot diameter and the increase in a transmitted light quantity. Consequently, in comparison with an earlier development, information can be recorded on an optical recording medium in a higher density, and information can be reproduced from an optical recording medium on which the information is recorded in a higher density. Hence, the increase in the capacity of an optical recording medium can be realized.

Incidentally, in the first embodiment, the anti-reflection coats 3 and 4 comprises the first layer 5 and the second layer 6. However, it is sufficient for the anti-reflection coats 3 and 4 to have the performance as the anti-reflection film by suppressing the reflectance of the light. The configurations of the coatings 3 and 4 are not limited to the one described above.

Moreover, the peripheral part P1 of the lens surface S1 includes a part at which the angle θ is 45 degrees or more, in an effective diameter. Furthermore, when the peripheral part includes a part at which the angle θ is 53 degrees or more, the quantity of the light transmitted through the peripheral part P1 can be increased. Thereby, it is possible to achieve the reduction in the diameter of a beam spot shape and the increase in the quantity of the transmitted light in a better balanced state.

Moreover, although the optical pickup apparatus 10 is configured to be applicable to both of a DVD and a CD, the configuration of the optical pickup apparatus 10 is not limited to the above-mentioned one. The optical pickup apparatus 10 may be, for example, one equipped with only a semiconductor laser for a DVD, which emits a light within the wavelength range from 630 nm to 680 nm. Moreover, although the optical pickup apparatus 10 is configured to be able to execute both of the recording and the reproducing of information, the optical pickup apparatus 10 is not limited to such a configuration. That is, it is needless to say that the lens according to the present invention can be applied to an optical pickup apparatus capable of either the recording or the reproducing of information.

Second Embodiment

A lens according to a second embodiment of the present invention is used as an object lens of an optical pickup apparatus similarly to the lens 1 of the first embodiment. Hereupon, the optical pickup apparatus to which the lens of the second embodiment is applied has almost the same configuration as the optical pickup apparatus 10 except that the semiconductor laser light source 11 is equipped with a semiconductor laser emitting a light having the wavelength $\lambda 1$ from 400 nm to 440 nm.

Since the lens of the second embodiment has almost the same configuration as the lens 1 of the first embodiment except some points which will be described later, only the points different from those of the lens 1 will be described in detail.

The surface on which the angle θ is 45 degrees or more is included in the peripheral part P1 of the lens surface S1 of the lens of the second embodiment.

Moreover, the film thickness of the anti-reflection coat 3 formed on the lens surface S1 is set in order that the wavelength $\lambda 2$ at which the reflectance of the light entering the central part C1 having the angle $\theta$ of zero degrees, of the lens surface S1 at the angle of zero degrees has a local minimum value, satisfies $\lambda 1 \leq \lambda 2$ and 420 nm $\leq \lambda 2 \leq 680$ nm. Incidentally, it is more preferable to set the film thickness of the anti-reflection coat 3 in order that the wavelength $\lambda 2$ satisfies 440 nm $\leq \lambda 2 \leq 650$ nm.

Hereupon, it is more preferable to set the film thickness of the anti-reflection coat 3 in order that the wavelength $\lambda 3$ at which the reflectance of the light entering the peripheral part $\lambda 1$ having the angle $\theta$ of 45 degrees, of the lens surface S1 at the angle of zero degrees has the local minimum value, satisfies 340 nm $\leq \lambda 3 \leq 560$ nm.

Moreover, the film thickness of the anti-reflection coat 4 formed on the lens surface S2 is set in order that the wavelength $\lambda 4$ at which the reflectance of the light entering the central part C2 having the angle $\theta$ of zero degrees, of the lens surface S2 at the angle of zero degrees has a local minimum value, satisfies 405 nm $\leq \lambda 4 \leq 500$ nm. Incidentally, it is more preferable to set the film thickness of the anti-reflection coat 4 in order that the wavelength $\lambda 4$ satisfies 410 nm $\leq \lambda 4 \leq 480$ nm.

As described above, in the lens of the second embodiment, the wavelength $\lambda 2$ at which the reflectance of the light entering the central part C1 of the lens surface S1 has the local minimum value is shifted to the longer wavelength side than the wavelength $\lambda 1$ the laser light source. Consequently, in the lens surface S1, since the peripheral part P1 transmits the light relatively more than the central part C1, it is possible to achieve the reduction in the diameter of a beam spot shape and the increase in a transmitted light quantity. Hence, the performance of the optical lens to be used for the optical information recoding and reproducing which is carried out by using the laser beam emitting a light within the wavelength range from 400 nm to 440 nm can be improved.

On the other hand, when the wavelength $\lambda 2$ at which the reflectance of the light entering the central part C1 has the local minimum value is larger than 680 nm, the transmittance of the light at the central part C1 becomes too low. The quantity of the light which is transmitted through the central part C1 becomes relatively too small in comparison with the quantity of the light which is transmitted through the peripheral part P1.

On the contrary, in the lens of the second embodiment, since the wavelength $\lambda 22$ at which the reflectance of the light entering the central part C1 has the local minimum value is 680 nm or less, it is possible to suppress that the quantity of the light which is transmitted through the central part C1 becomes too small. Consequently, a beam spot shape can be prevented from being lost, and the diameter of the spot shape can be reduced in a good balance. Furthermore, a sufficient transmitted light quantity can be secured.

Moreover, the wavelength $\lambda 4$ at which the reflectance of the light entering the central part C2 of the lens surface S2 has the local minimum value, satisfies 405 nm $\leq \lambda 4 \leq 500$ nm, the balance between the quantity of the light transmitted through the peripheral part P1 and the quantity of the light transmitted through the central part C1 is improved. Therefore, it is possible to achieve the reduction in a beam spot diameter and the increase in a transmitted light quantity.

Moreover, when the film thicknesses of the anti-reflection coats 3 and 4 are set in order that the wavelength $\lambda 2$ at which the reflectance of the light entering the central part C1 of the lens S1 at the angle of zero degrees has a local minimum value, satisfies 480 nm $\leq \lambda 2 \leq 570$ nm, and that the wavelength $\lambda 4$ at which the reflectance of the light entering the central part C2 of the lens S2 at the angle of zero degrees has a local minimum value, satisfies 405 nm $\leq \lambda 4 \leq 500$ nm, it is possible to obtain a desirable beam spot shape and a desirable transmitted light quantity in a stable state.

Moreover, in this case, the film thickness of the anti-reflection coat 3 formed on the light incident side lens surface S1 are set in order that the wavelength $\lambda 3$ at which the reflectance of the light entering the peripheral part P1 having the angle $\theta$ of 45 degrees, of the lens surface S1 at the angle of zero degrees has a local minimum value, satisfies 400 nm $\leq \lambda 3 \leq 480$ nm.

Third Embodiment

A lens 7 (shown in FIG. 4) according to a third embodiment of the present invention is used as an object lens of an optical pickup apparatus similarly to the lens of the second embodiment. Hereupon, an optical pickup apparatus to which the lens of the third embodiment is applied has almost the same configuration as the above-mentioned optical pickup apparatus to which the lens of the second embodiment is applied.

Figure 4:
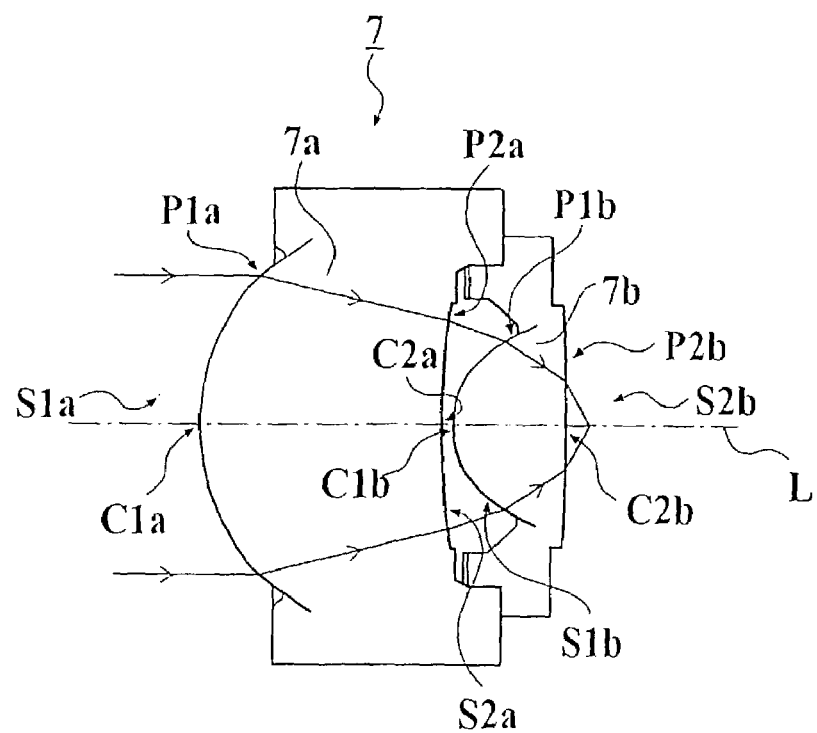
FIG. 4 is a schematic longitudinal sectional view showing a lens of a third embodiment.

As shown in FIG. 4, the lens 7 is a lens comprising two lenses which are a first lens 7a and a second lens 7b. The lens 7 is incorporated in the optical pickup apparatus with the first lens 7a directed to the side of the semiconductor laser light source 11 of the optical pickup apparatus.

The surface on which the angle $\theta$ is within the range from zero degrees (at a central part C1a) to 30 degrees (in the vicinity of a peripheral part P1a) is included in a lens surface (a first light incident side lens surface) S1a on the side of the semiconductor laser light source 11 in two lens surfaces S1a and S2a of the first lens 7a. Moreover, the surface on which the angle $\theta$ is within the range from zero degrees (a central part C2a) to 10 degrees or less (in the vicinity of a peripheral part P2a) is included in the lens surface (a first light emergent side lens surface) S2a on the side of the second lens 7b.

Moreover, the surface on which the angle $\theta$ is within the range from zero degrees (at a central part C1b) to 50 degrees or more (in the vicinity of a peripheral part P1b) is included in a lens surface (a second light incident side lens surface) S1b on the side of the first lens 7a in two lens surfaces S1b and S2b of the second lens 7b. Moreover, the surface on which the angle $\theta$ is within the range from zero degrees (a central part C2b) to 10 degrees (in the vicinity of a peripheral part P2b) is included in the lens surface S2b on the side of the optical recording medium R.

The first lens 7a and the second lens 7b comprises a base material and anti-reflection coats formed on the lens surfaces S1a, S2a, S1b and S2b, respectively, similarly to the aforementioned lens 1. The base material and the anti-reflection coats have substantially the same configurations of the base material 2 and the anti-reflection coats 3 and 4 of the lens 1 of the first embodiment except some points that will be described later.

The film thickness of the anti-reflection coat formed on the lens surface S1a is set in order that the wavelength $\lambda 5$ at which the reflectance of the light entering the central part C1a having the angle $\theta$ of zero degrees, of the lens surface S1a at the angle of zero degrees has a local minimum value, satisfies $\lambda 1 < \lambda 5$ and 410 nm $\leq \lambda 5 \leq 600$ nm. Incidentally, it is more preferable to set the film thickness of the anti-reflection coat in order that the wavelength $\lambda 5$ at which the reflectance of the light has the local minimum value, satisfies 420 nm $\leq \lambda 5 \leq 560$ nm.

Moreover, it is preferable to set the film thickness of the anti-reflection coat formed on the lens surface S1$a$ in order that the wavelength $\lambda 6$ at which the reflectance of the light entering the peripheral part having the angle $\theta$ of 30 degrees, of the lens surface S1$a$ at the angle of zero degrees has a local minimum value, satisfies 370 nm$\leq \lambda 6 \leq$550 nm.

Moreover, the film thickness of the anti-reflection coat formed on the lens surface S1$b$ is set in order that the wavelength $\lambda 7$ at which the reflectance of the light entering the central part C1$b$ having the angle $\theta$ of zero degrees, of the lens surface S1$b$ at the angle of zero degrees has a local minimum value, satisfies $\lambda 1 < \lambda 7$ and 420 nm$\leq \lambda 7 \leq$600 nm. Incidentally, it is more preferable to set the film thickness of the anti-reflection coat in order that the wavelength $\lambda 7$ satisfies 440 nm$\leq \lambda 7 \leq$560 nm.

Hereupon, it is more preferable to set the film thickness of the anti-reflection coat formed on the lens surface S1$b$ in order that the wavelength $\lambda 8$ at which the reflectance of the light entering the peripheral part P1$b$ having the angle $\theta$ of 45 degrees, of the lens surface S1$b$ at the angle of zero degrees has the local minimum value, satisfies 345 nm$\leq \lambda 8 \leq$490 nm.

Moreover, the film thickness of the anti-reflection coat formed on the lens surface S2$a$ is set in order that the wavelength $\lambda 9$ at which the reflectance of the light entering the central part C2$a$ having the angle $\theta$ of zero degrees, of the lens surface S2$a$ at the angle of zero degrees has a local minimum value, satisfies 380 nm$\leq \lambda 9 \leq$500 nm. Incidentally, it is more preferable to set the film thickness of the anti-reflection coat in order that the wavelength $\lambda 6$ satisfies 400 nm$\leq \lambda 9 \leq$480 nm.

Moreover, the film thickness of the anti-reflection coat formed on the lens surface S2$b$ is set in order that the wavelength $\lambda 10$ at which the reflectance of the light entering the central part C2$b$ having the angle $\theta$ of zero degrees, of the lens surface S2$b$ at the angle of zero degrees has a local minimum value, satisfies 380 nm$\leq \lambda 10 \leq$500 nm. Incidentally, it is more preferable to set the film thickness of the anti-reflection coat in order that the wavelength $\lambda 10$ satisfies 390 nm$\leq \lambda 10 \leq$480 nm.

As described above, according to the lens of the third embodiment, the wavelength $\lambda 5$ at which the reflectance of the light entering the central part C1$a$ of the lens surface S1$a$ of the first lens 7$a$ at the angle of zero degrees has the local minimum is shifted to the longer wavelength side than the wavelength $\lambda 1$ of the laser beam source. Moreover, the wavelength $\lambda 7$ at which the reflectance of the light entering the central part C1$b$ of the lens surface S1$b$ of the second lens 7$b$ at the angle of zero degrees has the local minimum value is shifted to the longer wavelength side than the wavelength $\lambda 1$ of the laser beam source.

Consequently, in the whole lens 7, since the peripheral parts P1$a$ and P1$b$ transmit the light relatively more than the central parts C1$a$ and C1$b$, it is possible to achieve the reduction in the diameter of a beam spot shape and the increase in a transmitted light quantity.

On the other hand, when the wavelength $\lambda 5$ at which the reflectance of the light entering the central part C1$a$ of the lens surface S1$a$ of the first lens 7$a$ has the local minimum value is larger than 600 nm, or when the wavelength $\lambda 7$ at which the reflectance of the light entering the central part C1$b$ of the lens surface S1$b$ of the second lens 7$b$ has the local minimum value is larger than 600 nm, the transmittance of the light at the central parts C1$a$ and C1$b$ becomes too low, and the quantities of the light which is transmitted through the central parts C1$a$ and C1$b$ become relatively too small in comparison with those of the light which is transmitted through the peripheral parts P1$a$ and P1$b$.

On the contrary, since the upper limits of the wavelengths $\lambda 5$ and $\lambda 7$ at which each reflectance of the light at the central parts C1$a$ and C1$b$ has the local minimum value are set as described above, it is possible to suppress that the quantities of the light which is transmitted through the central parts C1$a$ and C1$b$ become too small. Consequently, a beam spot shape can be prevented from being lost, and the diameter of a spot shape can be reduced in a good balance. Furthermore, a sufficient transmitted light quantity can be secured.

Moreover, the wavelengths $\lambda 5$ and $\lambda 7$ at which each reflectance of the light at the central parts C2$a$ and C2$b$ of the lens surfaces S2$a$ and S2$b$ has the local minimum values, are the same as or are longer than the wavelength $\lambda 1$ of the laser light source. Consequently, in the lens surfaces S2$a$ and S2$b$, the transmittance of each peripheral part P2$a$ and P2$b$ is not extremely lower than that of each central part C2$a$ and C2$b$. The transmittance of each peripheral part P2$a$ and P2$b$ is the same as or is higher than that of each central part C2$a$ and C2$b$. When the light passes through the lens surfaces S1$a$ and S2$a$, the quantity of the light transmitted through the peripheral parts P1$a$ and P2$a$ is larger than the quantity of the light transmitted through the central parts C1$a$ and C2$a$. When the light passes through the lens surfaces S1$b$ and S2$b$, the quantity of the light transmitted through the peripheral parts P1$b$ and P2$b$ is larger than the quantity of the light transmitted through the central parts C1$b$ and C2$b$. As a result, it is possible to reduce the diameter of the beam spot and to increase the quantity of the transmitted light.

EXAMPLES

In the following, the present invention will be concretely described by means of examples. However, the present invention is not limited to the examples.

1. Lenses of First Embodiment

<Transmittance of Lenses and Evaluations of Spot Shapes>

FIGS. 6A and 6B show the transmittance of the lenses 1 of the first embodiment described above in the case where the anti-reflection coats having the layer configurations shown in FIG. 5 are formed on the base materials, and the results of evaluations of the transmittance and beam spot shapes. Hereupon, as the lenses 1, lenses shaped so as to have the numerical aperture of 0.6 and to have the region in which the angle $\theta$ was within the range from zero degrees to 53 degrees or more on the lens surfaces S1 were used.

Incidentally, in a row "$\lambda$" in FIG. 5, the wavelengths at which the reflectance of the light which enters the lens or emerges from the lens perpendicularly (at the angle of zero degrees) has a local minimum value are shown. Hereupon, the reflectance was measured with Spectral Reflectance Thickness Monitor (FE-3000) (made by Otsuka Electronics Co., Ltd).

Figure 12:
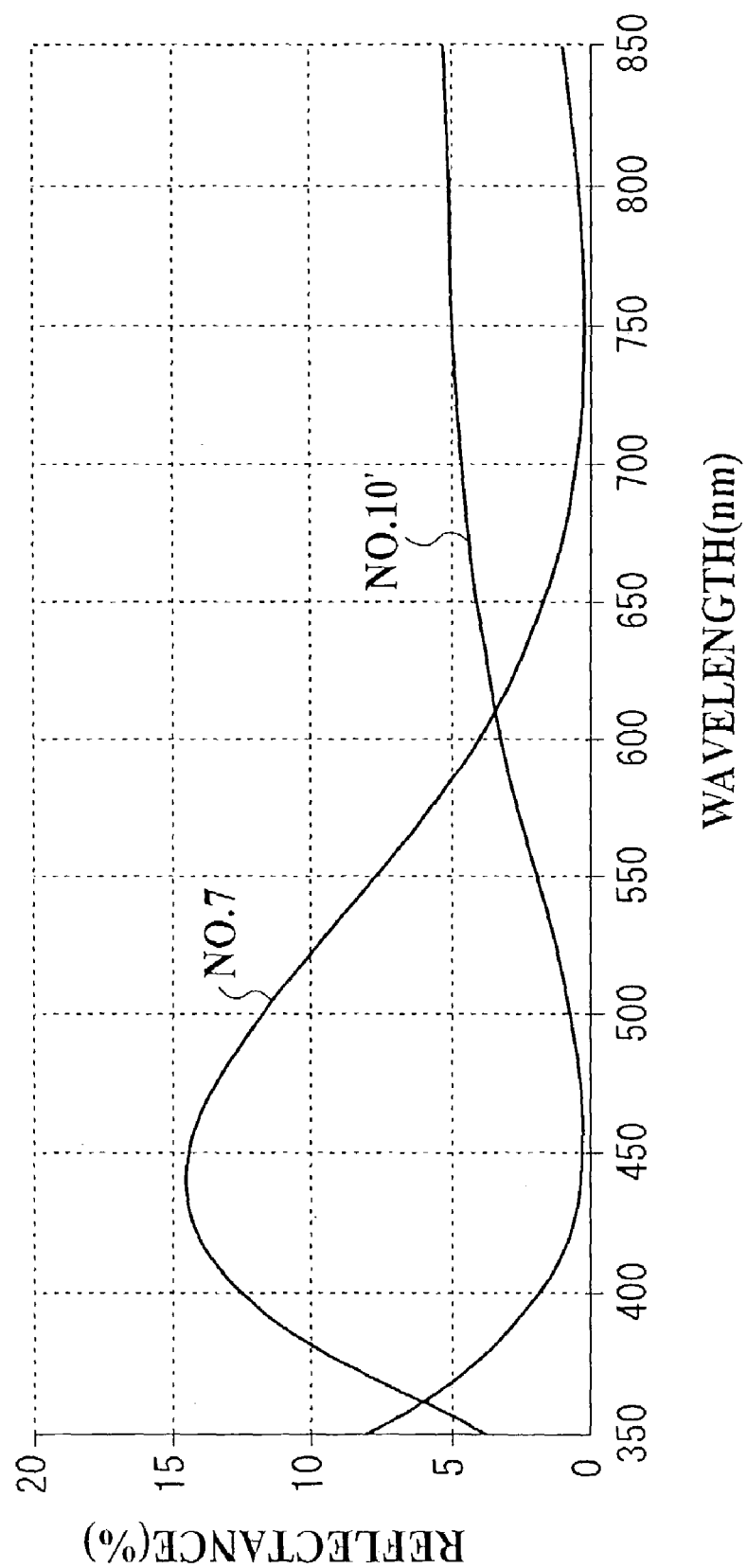
FIG. 12 is a graph showing examples of wavelength dependency of the reflectance of light for the anti-reflection coats having the layer configurations shown in FIGS. 5 and 8A.

Moreover, as an example, FIG. 12 shows the wavelength dependency of the reflectance of the light entering the anti-reflection coat of the layer configuration of No. 7 shown in FIG. 5 at the angle of zero degrees.

Moreover, in a row "$\lambda 12$ ($\lambda 14$)" in FIGS. 6A and 6B, the wavelengths at which the reflectance of the light which enters or emerges from the central parts C1 of the lenses perpendicularly in the anti-reflection coats 3 formed on the lens surfaces S1 of the lenses 1 has a local minimum value are shown. Incidentally, the values of the wavelengths $\lambda 14$ at which the reflectance of the light entering the peripheral parts P1 having the angles $\theta$ of 45 degrees, of the lens surfaces S1 at the angle of zero degrees has a local minimum value are shown in parentheses.

Moreover, in a column "λ13", the wavelengths at which the reflectance of the light which enters or emerges from the central parts C2 of the lenses perpendicularly in the anti-reflection coats 4 formed on the lens surfaces S2 of the lenses 1 has a local minimum value are shown.

Moreover, in FIGS. 6A and 6B, each transmittance (from the minimum values thereof to the maximum values thereof) of the light within each of the wavelength ranges from 630 nm to 670 nm and from 780 nm to 790 nm is shown. Moreover, in FIGS. 6A and 6B, the evaluations of the transmittance and the evaluations of beam spot shapes are shown by means of marks □, Δ and x. In tables, "A" denotes the transmittance of the light having a wavelength from 630 nm to 670 nm, the evaluation of the transmittance and the evaluation of the shot shape, and "B" denotes the transmittance of the light having a wavelength from 780 nm to 790 nm, the evaluation of the transmittance and the evaluation of the shot shape.

In the evaluations of the transmittance, marks ○ indicate practically very good levels and are noted in the blanks of the film configurations capable of always obtaining the transmittance of 96% or more among the transmittance of the light having the wavelength range from 630 nm to 670 nm. Marks Δ indicate practically good levels and are noted in the blanks of the film configurations capable of always obtaining the transmittance of 95% or more and not always obtaining the transmittance of 96% or more. Marks x indicate practically problematic levels and are noted in the blanks of the other film configurations. Moreover, marks ○ are noted in the blanks of the film configurations capable of always obtaining the light transmittance of 95% or more among the transmittance of the light having wavelengths from 780 nm to 790 nm. Marks x are noted in the blanks of the other film configurations among the transmittance of the light having wavelengths from 780 nm to 790 nm.

Figure 7A:
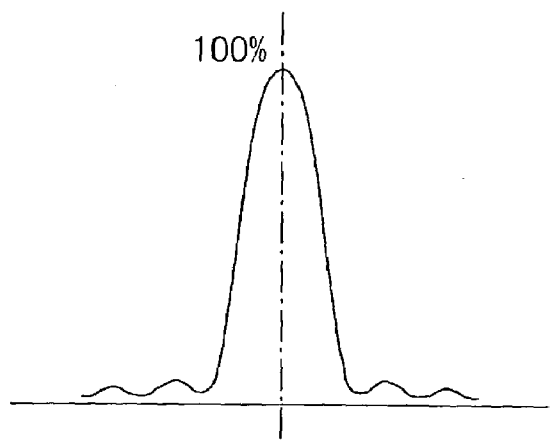
FIGS. 7A, 7B and 7C are drawings for explaining evaluations of beam spot shapes.
Figure 7B:
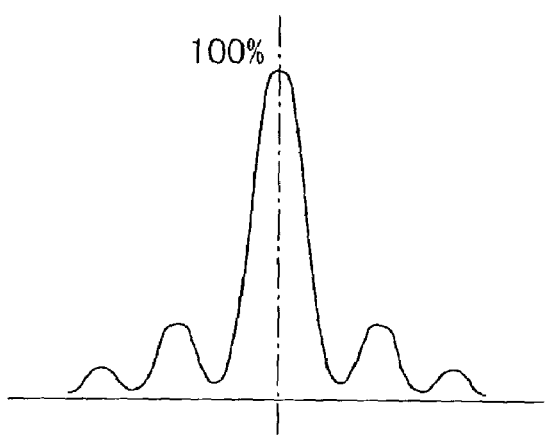
Figure 7C:
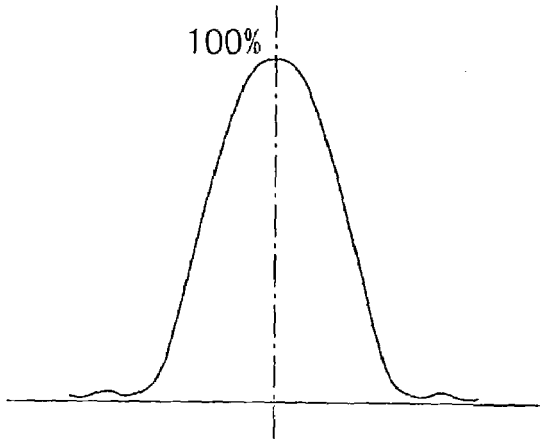

Moreover, the evaluations of the beam spot shapes will be described by reference to FIGS. 7A to 7C. In FIGS. 7A to 7C, each ordinate axis indicates light quantities, and each abscissa axis indicates a distance from the optical axis.

In the evaluations of the beam spot shapes, marks ○ are noted in the blanks of the film configurations and indicate beam spot shapes having a relatively small spot diameter and a relatively small light quantity at the peripheries of the spots (as shown in FIG. 7A). Moreover, marks x are noted in the blanks of the film configurations and indicate beam spot shapes having a relatively small spot diameter, but a relatively large light quantity at the peripheries of the spots (as shown in FIG. 7B). Moreover, marks x are noted in the blanks of the film configurations and indicate beam spot shapes having a relatively small light quantity at the peripheries of the spot, but a relatively large spot diameter (as shown in FIG. 7C).

If the transmittance is the Δ level and the spot shape is the ○ level, it can be judged that the operation of recording and of reproducing can be performed without any problems. Moreover, if the transmittance is the ○ level and the spot shape is the ○ level, it can be judged to be preferable because the operation of recording and of reproducing can be performed in a more stable and good state. If at lease one of the transmittance and the spot shape is x level, it can be judged to be problematic because the operation of recording and of reproducing is unstable.

From FIGS. 6A and 6B, the layer configurations which are preferable to be applied to the anti-reflection coats 3 and 4 of the lenses 1 can be known.

That is, in the case where the wavelength of the laser beam of the semiconductor laser light source of an optical pickup apparatus is within the range from 630 nm to 670 nm, in order to obtain the transmittance of the Δ level and a spot shape of the ○ level, it can be found that it is preferable to apply the layer configurations in which the wavelength λ12 at which the reflectance of the light entering or emerging from the lens perpendicularly has a local minimum value, is within the range from 680 nm to 870 nm as the layer configuration of the anti-reflection coat 3 at the central part C1 having the angle θ of zero degrees, in the lens surface S1. Moreover, in order to obtain the transmittance of the ○ level and a spot shape of the ○ level, it can be found that it is preferable to apply the layer configurations in which the wavelength λ12 is within the range from 710 nm to 850 nm.

From these facts, it can be found that it is preferable to apply the layer configurations from No. 4 to No. 13 in FIG. 5 as the layer configuration of the anti-reflection coat 3 at the central part C1, and that it is more preferable to apply the layer configurations from No. 6 to No. 12.

Moreover, in order to obtain the transmittance of the Δ level and a spot shape of the ○ level, it can be found that it is preferable to apply the layer configurations in which the wavelength λ13 at which the reflectance of the light entering or emerging from the lens perpendicularly has a local minimum value, is within the range from 650 nm to 800 nm as the layer configuration of the anti-reflection coat 4 at the central part C2 having the angle θ of zero degrees, in the lens surface S2. Moreover, in order to obtain the transmittance of the ○ level and a spot shape of the ○ level, it can be found that it is more preferable to apply the layer configuration in which the wavelength λ13 is within the range from 680 nm to 790 nm.

From these facts, it can be found that it is preferable to apply the layer configurations from No. 2 to No. 10 as the layer configuration of the anti-reflection coat 4 at the central part C2, and that it is more preferable to apply the layer configurations from No. 4 to No. 9.

Incidentally, in the case where the layer configuration in which the wavelength λ12 was within the range from 680 nm to 870 nm was applied as the anti-reflection coat 3 at the central part C1, the wavelength λ14 at which the reflectance of the light perpendicularly entering or emerging from the peripheral part P1 having the angle θ of 45 degrees had a local minimum value, was within the range from 560 nm to 722 nm.

Moreover, in the case where the wavelength of the laser beam of the semiconductor laser light source of the optical pickup apparatus is within the range from 650 nm to 670 nm, in order to obtain the transmittance of the Δ level and a spot shape of the ○ level, it can be found that it is preferable to apply the layer configurations in which the wavelength λ12 at which the reflectance of the light entering or emerging from the lens perpendicularly has a local minimum value, is within the range from 710 nm to 850 nm as the layer configuration of the anti-reflection coat 3 at the central part C1 having the angle θ of zero degrees, in the lens surface S1. Incidentally, in the case where the layer configurations in which the wavelength λ12 was within the range from 710 nm to 850 nm was applied as the anti-reflection coat 3 at the central part C1, the wavelength λ14 at which the reflectance of the light perpendicularly entering or emitted from the peripheral part P1 having the angle θ of 45 degrees had a local minimum value, was within the range from 590 nm to 705 nm.

Moreover, it can be found that it is preferable to apply the layer configurations in which the wavelength λ13 at which the reflectance of the light entering or emerging from the lens perpendicularly has a local minimum value, is within the range from 650 nm to 800 nm as the layer configuration of the anti-reflection coat 4 at the central part C2 having the angle θ of zero degrees, in the lens surface S2.

From these facts, it can be found that it is preferable to apply the layer configurations from No. 5 to No. 12 as the layer configuration of the anti-reflection coat 3 at the central part C1, and that it is preferable to apply the layer configurations from No. 3 to No. 10 as the layer configuration of the anti-reflection coat 4 at the central part C2.

Moreover, in the case where the lens 1 is applied to an optical pickup for the use of both a DVD and a CD using a laser beam within the short wavelength range from 630 nm to 670 nm and a laser beam within the long wavelength range from 780 nm to 790 nm, in order to obtain the transmittance of the Δ level, preferably the transmittance of the ○ level with the light having the short wavelength, and in order to obtain the transmittance of the ○ level with the light having the long wavelength, and further in order to obtain a spot shape of the ○ level, it can be found that it is preferable to apply the layer configurations in which the wavelength λ12 at which the reflectance of the light entering or emerging from the lens perpendicularly has a local minimum value, is within the range from 680 nm to 870 nm, more preferably within the range from 710 nm to 850 nm, as the layer configuration of the anti-reflection coat 3 at the central part C1 having the angle θ of zero degrees, in the lens surface S1.

Moreover, it can be found that it is preferable to apply the layer configurations in which the wavelength λ13 at which the reflectance of the light entering or emerging from the lens perpendicularly has a local minimum value, is within the range from 650 nm to 800 nm, more preferably within the range from 680 nm to 790 nm, as the layer construction of the anti-reflection coat 4 at the central part C2 having the angle θ of zero degrees, in the lens surface S2.

From these facts, it can be found that it is preferable to apply the layer configurations from No. 4 to No. 13 as the layer configuration of the anti-reflection coat 3 at the central part C1, and that it is preferable to apply the layer configurations from No. 2 to No. 10 as the layer configuration of the anti-reflection coat 4 at the central part C2.

Incidentally, in the case where the layer configurations in which the wavelength λ12 was within the range from 710 nm to 850 nm were applied as the anti-reflection coat 3 at the central part C1, the wavelength λ14 at which the reflectance of the light perpendicularly entering or emerging from the peripheral part P1 having the angle θ of 45 degrees had a local minimum value, was within the range from 590 nm to 705 nm.

Moreover, when the film thickness of the anti-reflection coat 3 formed on the lens surface S1 is set in order that the wavelength λ12 at which the reflectance of the light entering the central part C1 of the lens surface S1 at the angle of zero degrees has a local minimum value, has the wavelength range from 710 nm to 790 nm, and when the film thickness of the anti-reflection coat 4 formed on the lens surface S2 is set in order that the wavelength λ13 at which the reflectance of the light entering the central part C2 at the angle of zero degrees has a minimum value, has the wavelength range from 710 nm to 790 nm, the evaluations of beam spot shapes and the evaluations of transmittance can always keep the ○ levels. That is, it is possible to obtain an optical lens having superior optical characteristics which are very stable. Moreover, in that case, in the anti-reflection coat 3 formed on the lens surface S1, the reflectance of the light entering the peripheral part P1 having the angle θ of 45 degrees, of the lens surface S1 at the angle of zero degrees had a local minimum value within the wavelength range from 590 nm to 660 nm.

<Evaluations of Lenses>

The anti-reflection coats 3 and 4 having the layer configurations shown in the following Table 1 (the numbers of the layer configurations shown in each blank correspond to those of FIG. 5) were formed on the lens surfaces S1 and S2 of the base material 2 which is processed in a lens shape by means of the vacuum evaporation method, and thereby the lenses 1 were produced (Examples 1–3, Comparative Example 1).

TABLE 1

|  |  | EXAMPLE 1 | EXAMPLE 2 | EXAMPLE 3 | COMPARATIVE EXAMPLE 1 |
|---|---|---|---|---|---|
| LASER LIGHT WAVELENGTH (nm) | | 660 | 660 | 660, 785 | 660, 785 |
| SURFACE S1 | ANGLE θ | 0~53 | 0~60 | 0~50 | 0~50 |
|  | ANTI-REFLECTION COAT | NO. 6 | NO. 8 | NO. 6 | NO. 13 |
| SURFACE S2 | ANGLE θ | 0~15 | — | — | — |
|  | ANTI-REFLECTION COAT | NO. 6 | NO. 7 | NO. 6 | NO. 11 |

Hereupon, the wavelengths of the laser beams of the semiconductor laser light sources 11 of the optical pickup apparatus 10 to which the lenses 1 are applied, are shown in the row of LASER LIGHT WAVELENGTH in Table 1.

Moreover, in the rows of ANGLE θ, ranges of the angles θ of each of the lens surfaces S1 and S2 are shown.

In the high NA lens of Example 1, when parallel rays having a wavelength of 660 nm were radiated on the lens surface S1, the transmittance of the light was 97%, and the beam spot shape was good.

Moreover, in the high NA lens of Example 2, when parallel rays having a wavelength of 660 nm were radiated on the lens surface S1, the transmittance of the light was 97%, and the beam spot shape was good. From the facts described above, it can be found that it is possible to provide object lenses having a high numerical aperture and a good light condensing performance according to Examples 1 and 2. Moreover, it can be found that the increase in the capacity of information recording can be realized by the use of the lenses of Examples 1 and 2 in an optical pickup apparatus.

In the high NA lens of Example 3, when parallel rays having a wavelength of 660 nm were radiated on the lens surface S1, the transmittance of the light was 97%, and the beam spot shape was good. Moreover, when parallel rays having a wavelength of 785 nm were radiated on the lens surface S1, the transmittance of the light was 95.7%, and the beam spot shape was good.

From the facts described above, it can be found that it is possible to provide an object lens having a high numerical aperture and a good light condensing performance according to Example 3. Moreover, it can be found that the increase in the capacity of the recording of a DVD and a CD can be realized by using the lens of Example 3 as an object lens in an optical pickup apparatus for both of the DVD and the CD.

On the contrary, in the lens of Comparative Example 1, when parallel rays having a wavelength of 785 nm were radiated on the lens surface S1, the transmittance of the light was 97%, and the beam spot shape was good. However, when parallel rays having a wavelength of 660 nm were radiated on the lens surface S1, the transmittance of the light was 93.4%, and the beam spot shape included much noise light. Consequently, it can be known that the lens of Comparative Example 1 is unsuitable for the use of an object lens of an optical pickup apparatus for a DVD, and that it is difficult to realize the increase in the capacity of recording of a DVD by the lens of Comparative Example 1.

2. Lenses of Second Embodiment

<Transmittance of Lenses and Evaluations of Spot Shapes>

FIGS. 9A and 9B show the transmittance of the lenses of the second embodiment described above in the case where the anti-reflection coats having the layer configurations shown in FIGS. 8A and 8B are formed on the base materials, and the results of evaluations of the transmittance and beam spot shapes.

Hereupon, as the lenses 1, lenses shaped so as to have a region in which the angle θ is within the range from zero degrees to 53 degrees or more on the lens surfaces S1 were used. Incidentally, in the row "λ" of FIGS. 8A and 8B, the wavelengths at which the reflectance of the light which enters or emerges from the lens perpendicularly (at the angle of zero degrees) has a local minimum values are shown. Moreover, the reflectance was measured with Spectral Reflectance Thickness Monitor (FE-3000) (made by Otsuka Electronics Co., Ltd).

Hereupon, as an example, FIG. 12 shows the wavelength dependency of the reflectance of the light entering the anti-reflection coat of the layer configuration of No. 10' shown in FIG. 8A at the angle of zero degrees.

Moreover, in a row "λ2 (λ3)" in FIGS. 9A and 9B, the wavelengths at which the reflectance of the light entering or emerging from the central parts C1 of the lenses perpendicularly in the anti-reflection coats 3 formed on the lens surfaces S1 of the lenses 1 has a local minimum value are shown. Incidentally, the values of the wavelengths λ3 at which the reflectance of the light entering the peripheral parts P having the angles θ of 45 degrees, of the lens surfaces S1 at the angle of zero degrees has a minimum value are shown in parentheses.

Moreover, in a column "λ4", the wavelengths at which the reflectance of the light which enters or emerges from the central parts C2 of the lenses perpendicularly in the anti-reflection coats 4 formed on the lens surfaces S2 of the lenses 1 has a local minimum value are shown.

Moreover, in FIGS. 9A and 9B, each transmittance (from the minimum values thereof to the maximum values thereof) of the light within the wavelength range from 400 nm to 440 nm is shown. Moreover, in FIGS. 9A and 9B, the evaluations of the transmittance and the evaluations of beam spot shapes are shown by means of marks ○, Δ and ×. In tables, "C" denotes the transmittance of the light having a wavelength from 400 nm to 490 nm (transmittance of the light having a wavelength of 405 nm), the evaluation of the transmittance and the evaluation of the shot shape, and "D" denotes the transmittance of the light having a wavelength from 400 nm to 440 nm, the evaluation of the transmittance and the evaluation of the shot shape.

In the evaluations of the transmittance, marks ○ indicate practically very good levels and are noted in the blanks of the film configurations capable of always obtaining the transmittance of 96% or more among the transmittance of the light of the wavelength range from 400 nm to 440 nm. Marks Δ indicate practically good levels and are noted in the blanks of the film configurations capable of always obtaining the transmittance of 95% or more and not always obtaining the transmittance of 96%. Marks × indicate practically problematic levels and are noted in the blanks of the other film configurations.

Moreover, the transmittance of the light having the wavelength of 405 nm is noted in parentheses.

From FIGS. 9A and 9B, the layer configurations which are preferable to be applied to the anti-reflection coats 3 and 4 of the lenses 1 can be known.

That is, in the case where the wavelength of the laser beam of the semiconductor laser light source of an optical pickup apparatus is within the range from 400 nm to 440 nm, in order to obtain the transmittance of the Δ level and a spot shape of the ○ level, it can be found that it is preferable to apply the layer configurations in which the wavelength λ2 at which the reflectance of the light entering or emerging from the lens perpendicularly has a local minimum value, is within the range from 420 nm to 680 nm as the layer configuration of the anti-reflection coat 3 at the central part C1 having the angle θ of zero degrees, in the lens surface S1. Moreover, in order to obtain the transmittance of the ○ level and a spot shape of the ○ level, it can be found that it is preferable to apply the layer configurations in which the wavelength λ2 is within the range from 440 nm to 650 nm.

From these facts, it can be found that it is preferable to apply the layer configurations from No. 7' to No. 18' in FIGS. 8A and 8B as the layer configuration of the anti-reflection coat 3 at the central part C1, and that it is more preferable to apply the layer configurations from No. 7' to No. 17'. Incidentally, in the case where the layer configuration in which the wavelength λ2 was within the range from 420 nm to 680 nm was applied as the anti-reflection coat 3 at the central part C1, the wavelength λ3 at which the reflectance of the light perpendicularly entering the peripheral part P1 having the angle θ of 45 degrees had a local minimum value, was within the range from 340 nm to 560 nm.

Moreover, in order to obtain the transmittance of the Δ level and a spot shape of the ○ level, it can be found that it is preferable to apply the layer configurations in which the wavelength λ4 at which the reflectance of the light entering or emerging from the lens perpendicularly has a local minimum value, is within the range from 405 nm to 500 nm as the layer configuration of the anti-reflection coat 4 at the central part C2 having the angle θ of zero degrees, in the lens surface S2. Moreover, in order to obtain the transmittance of the ○ level and a spot shape of the ○ level, it can be found that it is more preferable to apply the layer configurations in which the wavelength λ4 is within the range from 410 nm to 480 nm.

From these facts, it can be found that it is preferable to apply the layer configurations from No. 5' to No. 13' as the layer configuration of the anti-reflection coat 4 at the central part C2, and that it is more preferable to apply the layer configurations from No. 6' to No. 12'.

Moreover, it can be found that it is preferable to apply the layer configurations in which the wavelength λ2 is within the range from 480 nm to 570 nm to the lens surface S1, and to apply the layer configurations from No. 12' to No. 15' shown in FIG. 8B as the layer configuration of the anti-reflection coat 3 at the central part C1 in order to obtain the transmittance of 97% or more of the light having the wavelength of 405 nm and to obtain a spot shape of the ○ level. Incidentally, in this case, the reflectance of the light entering the peripheral part P1 having the angle θ of 45 degrees, of the lens surface S1 at the angle of zero degrees had a local minimum value within the wavelength range from 400 nm to 480 nm.

Moreover, it can be found that it is preferable to apply the layer configurations in which the wavelength λ4 is within the range from 410 nm to 450 nm to the lens surface S2, and to apply the layer configurations from No. 6' to No. 10' shown in FIG. 8A as the layer configuration of the anti-reflection coat 4 at the central part C2.

<Evaluations of Lenses>

The anti-reflection coats 3 and 4 having the layer configurations shown in the following Table 2 (the numbers of the layer configurations shown in each blanks correspond to those of FIGS. 8A and 8B) were formed on the lens surfaces S1 and S2 of the base material 2 which is processed in a lens shape by means of the vacuum evaporation method, and thereby the lenses 1 were produced (Examples 4 and 5).

TABLE 2

|  |  | EX-AMPLE 4 | EX-AMPLE 5 | COMPARATIVE EXAMPLE 2 |
| --- | --- | --- | --- | --- |
| LASER LIGHT WAVELENGTH (nm) |  | 405 | 405 | 405 |
| SURFACE S1 | ANGLE θ | 0~60 | 0~60 | 0~60 |
|  | ANTI-REFLECTION COAT | NO. 9' | NO. 14' | NO. 20' |
| SURFACE S2 | ANGLE θ | 0~10 | 0~15 | 0~15 |
|  | ANTI-REFLECTION COAT | NO. 5' | NO. 9' | NO. 10' |

In the high NA lens of Example 4, when parallel rays having a wavelength of 405 nm were radiated on the lens surface S1, the transmittance of the light was 96.2%, and the beam spot shape was good.

Moreover, in the high NA lens of Example 5, when parallel rays having a wavelength of 405 nm were radiated on the lens surface S1, the very good transmittance of the light of 97.6% was obtained, and the beam spot shape was good. Consequently, it can be found that it is possible to provide an object lens having a high numerical aperture and a good light condensing performance according to Examples 4 and 5. Moreover, it can be found that the increase in the capacity of information recording can be realized by using the lenses of Examples 4 and 5 as an object lens in an optical pickup apparatus.

On the contrary, in the lens of Comparative Example 2, when parallel rays having a wavelength of 405 nm were radiated on the lens surface S1, the transmittance of the light was a low value of 94.8%, and the beam spot shape included much noise light. Thus, the evaluation of Comparative Example 2 was at the × level. Consequently, the lens of Comparative Example 2 was unsuitable for the use of an object lens of an optical pickup apparatus.

3. Lenses of Third Embodiment

<Transmittance of Lenses and Evaluations of Spot Shapes>

FIGS. 10A and 10B show the transmittance of the lenses 7 of the third embodiment described above and the results of evaluations of the transmittance and the beam spot shapes of the lenses 7 in the following case. That is, in the case, the anti-reflection coats having the layer configurations shown in FIG. 8 are formed on the lens surfaces S1a and S2a of the first lenses 7a, the anti-reflection coat of No. 11' shown in FIG. 8 is formed on the lens surface S1b of the second lens 7b, and the anti-reflection coat of No. 8' is formed on the lens surface S2b of the second lens 7b.

Moreover, the transmittance of radiated parallel rays having the wavelength of 405 nm is noted in parentheses of the light.

Hereupon, as the lenses 7a, lenses shaped so as to have a region in which the angle θ was within the range from zero degrees to 35 degrees or more on the lens surfaces S1a were used. Moreover, as the lenses 7b, lenses shaped so as to have a region in which the angle θ was within the range from zero degrees to 50 degrees or more on the lens surfaces S1b were used.

Hereupon, in a row "λ5 (λ6)" of FIGS. 10A and 10B, the wavelengths at which the reflectance of the light perpendicularly entering or emerging from the central parts C1a in the anti-reflection coats formed on the lens surfaces S1a of the first lenses 7a has a local minimum value are shown. Incidentally, the values of the wavelengths λ6 at which the reflectance of the light entering the peripheral parts P1 having the angles θ of 30 degrees, of the lens surfaces S1 at the angle of zero degrees has a local minimum value are shown in parentheses.

Moreover, in a column "λ9", the wavelengths at which the reflectance of the light entering or emerging from the central parts C2a of the lenses perpendicularly in the anti-reflection coats 4 formed on the lens surfaces S2a of the first lenses 7a has a local minimum value are shown. Incidentally, the reflectance was measured with Spectral Reflectance Thickness Monitor (FE-3000) (made by Otsuka Electronics Co., Ltd).

Moreover, with respect to the other matters, the table formats of FIGS. 10A and 10B are the same as those of FIGS. 9A and 9B.

From FIGS. 10A and 10B, the layer configurations which are preferable to be applied to the anti-reflection coats of the first lenses 7a can be known.

That is, in the case where the wavelength of the laser beam of the semiconductor laser light source of an optical pickup apparatus is within the range from 400 nm to 440 nm, in order to obtain the transmittance of the Δ level and a spot shape of the ○ level, it can be found that it is preferable to apply the layer configurations in which the wavelength λ5 at which the reflectance of the light entering or emerging from the lens perpendicularly has a local minimum value, is within the range from 410 nm to 600 nm as the layer configuration of the anti-reflection coat at the central part C1a having the angle θ of zero degrees, in the lens surface S1a. Incidentally, when the layer configurations in which the wavelength λ5 was within the range from 410 nm to 600 nm were applied to the anti-reflection coat 3 at the central part C1a, the wavelength λ6 at which the reflection of the light entering the peripheral part P1a having the angle θ of 30 degrees had a local minimum value was within the range from 370 nm to 550 nm.

Moreover, in order to obtain the transmittance of the ○ level and a spot shape of the ○ level, it can be found that it is preferable to apply the layer configurations in which the wavelength λ5 is within the range from 420 nm to 560 nm.

Moreover, in order to obtain the transmittance of the Δ level and a spot shape of the ○ level, it can be found that it is preferable to apply the layer configurations in which the wavelength λ9 at which the reflectance of the light entering or emerging from the lens perpendicularly has a local minimum value, is within the range from 380 nm to 500 nm as the layer configuration of the anti-reflection coat at the central part C2a having the angle θ of zero degrees, in the lens surface S2a. Moreover, in order to obtain the transmittance of the ○ level and a spot shape of the ○ level, it can be found that it is preferable to apply the layer configurations in which the wavelength λ9 is within the range from 400 nm to 480 nm.

From these facts, it can be found that it is preferable to apply the layer configurations from No. 6' to No. 16' shown in FIGS. 8A and 8B as the layer configuration of the anti-reflection coat at the central part C1a, and that it is preferable to apply the layer configurations from No 2' to No. 13' as the layer configuration at the central part C2a.

Moreover, the transmittance of the lenses 7 of the third embodiment described above and beam spot shapes of the following case were evaluated in case that the anti-reflection coat of No. 10' shown in FIG. 8A was formed on the lens surface S1a of the first lens 7a; the anti-reflection coat of No. 6' shown in FIG. 8A was formed on the lens surface S1b of the first lens 7a; and the anti-reflection coats having the layer configurations shown in FIGS. 8A and 8B were formed on the lens surfaces S1b and S2b of the second lens 7b. FIGS. 1A and 11B show the results of the transmittance and the evaluations.

Moreover, the transmittance of radiated parallel rays having the wavelength of 405 nm is noted in parentheses.

Hereupon, in a row "7 (λ8)" of FIGS. 11A and 11B, the wavelengths at which the reflectance of the light entering or emerging from the lens perpendicularly at the central part C1b of the lens in the anti-reflection coat formed on the lens surface S1b of the second lens 7b has a local minimum value are shown. Incidentally, the values of the wavelengths λ8 at which the reflectance of the light entering the peripheral parts P1 having the angles θ of 45 degrees, of the lens surfaces S1 at the angle of zero degrees has a local minimum value are shown in parentheses.

Moreover, in a column "λ10", the wavelengths at which the reflectance of the light perpendicularly entering or emerging from the central part C2b of the lens in the anti-reflection coats formed on the lens surfaces S2b of the second lenses 7b has a local minimum value are shown. Moreover, with respect to the other matters, the table formats of FIGS. 11A and 11B are the same as those of FIGS. 10A and 10B.

From FIGS. 11A and 11B, the layer configurations which are preferable to be applied to the anti-reflection coats of the second lenses 7b can be known.

That is, in the case where the wavelength of the laser beam of the semiconductor laser light source of an optical pickup apparatus is within the range from 400 nm to 440 nm, in order to obtain the transmittance of the Δ level and a spot shape of the ○ level, it can be found that it is preferable to apply the layer configurations in which the wavelength λ7 at which the reflectance of the light entering the lens perpendicularly has a local minimum value, is within the range from 420 nm to 600 nm as the layer configuration of the anti-reflection coat at the central part C1b having the angle θ of zero degrees, in the lens surface S1b. Incidentally, when the layer configurations in which the wavelength λ7 was within the range from 420 nm to 600 nm were applied to the anti-reflection coat 3 at the central part C1b, the wavelength λ8 at which the reflection of the light perpendicularly entering the peripheral part P1b having the angle of 45 degrees, had a local minimum value was within the range from 350 nm to 490 nm.

Moreover, in order to obtain the transmittance of the ○ level and a spot shape of the ○ level, it can be found that it is preferable to apply the layer configurations in which the wavelength λ7 is within the range from 430 nm to 560 nm.

Moreover, in order to obtain the transmittance of the Δ level and a spot shape of the ○ level, it can be found that it is preferable to apply the layer configurations in which the wavelength λ10 at which the reflectance of the light entering the lens perpendicularly has a local minimum value, is within the range from 380 nm to 500 nm as the layer configuration of the anti-reflection coat at the central part C2b having the angle θ of zero degrees, in the lens surface S2b.

Moreover, in order to obtain the transmittance of the ○ level and a spot shape of the ○ level, it can be found that it is more preferable to apply the layer configurations in which the wavelength λ10 is within the range from 390 nm to 480 nm.

From these facts, it can be found that it is preferable to apply the layer configurations shown in No. 7' to No. 16' of FIGS. 8A and 8B as the layer configurations of the anti-reflection coats at the central parts C1b, and that it is preferable to apply the layer configurations shown in No. 2' to No. 13' of FIGS. 8A and 8B as the layer configurations at the central parts C2b.

Moreover, from FIGS. 11A and 10B, it can be found that it is preferable to apply the layer configurations in which the wavelength λ5 is within the range from 420 nm to 480 nm as the anti-reflection coats of the first lenses 7a, and to apply the layer configurations shown in No. 7' to No. 12' of in FIGS. 8A and 8B as the layer configurations of the anti-reflection coats at the central parts of the lens surfaces S1a in order to obtain high transmittance of 97% or more for the lenses 7 and in order to obtain good spot shapes when parallel rays having the wavelength of 405 nm are radiated. Moreover, in this case, the wavelength λ6 at which the reflectance of the light perpendicularly entering the peripheral parts P1a having the angle θ of 30 degrees, had a local minimum value was within the wavelength range from 380 nm to 440 nm.

Moreover, it can be found that it is preferable to apply the layer configurations in which the wavelength λ9 is within the range from 400 nm to 430 nm, and to apply the layer configurations from No. 4' to No. 8' shown in FIG. 8A as the anti-reflection coats at the central parts of the lens surfaces S2a.

Moreover, from FIGS. 11A and 11B, it can be found that it is preferable to apply the layer configurations in which the wavelength λ7 is within the range from 430 nm to 480 nm as the anti-reflection coats of the second lenses 7b, and to apply the layer configurations shown in No. 8' to No. 12' of FIGS. 8A and 8B as the layer configurations of the anti-reflection coats at the central parts of the lens surfaces S1b in order to obtain high transmittance of 97% or more for the lenses 7 and in order to obtain good spot shapes when parallel rays having the wavelength of 405 nm are radiated. Incidentally, in this case, the wavelength λ8 at which the reflectance of the light perpendicularly entering the peripheral parts P1*b* having the angle θ of 45 degrees, had a local minimum values was within the wavelength range from 357 nm to 400 nm.

Moreover, it can be found that it is preferable to apply the layer configurations in which the wavelength λ10 is within the range from 405 nm to 450 nm, and to apply the layer configurations shown in No. 5' to No. 10' of FIG. 8A as the anti-reflection coats at the central parts of the lens surfaces S2*b*.

<Evaluations of Lenses>

The anti-reflection coats having the layer configurations shown in the following Table 3 (the numbers of the layer configurations shown in each blanks correspond to those of FIGS. 8A and 8B) were formed on the lens surfaces S1*a*, S2*a*, S1*b* and S2*b* of the base material which is processed in a lens shape by means of the vacuum evaporation method, and thereby the lenses 7 were produced (Examples 6 and 7, Comparative Example 3).

TABLE 3

|  |  |  | EXAMPLE 6 | EXAMPLE 7 | COMPARATIVE EXAMPLE 3 |
|---|---|---|---|---|---|
|  | LASER LIGHT | WAVELENGTH (nm) | 405 | 405 | 405 |
| FIRST LENS | SURFACE S1a | ANGLE θ | 0~37 | 0~35 | 0~37 |
|  |  | ANTI-REFLECTION COAT | NO. 10' | NO. 9' | NO. 4' |
|  | SURFACE S2a | ANGLE θ | 0~10 | 0~10 | 0~10 |
|  |  | ANTI-REFLECTION COAT | NO. 6' | NO. 6' | NO. 2' |
| SECOND LENS | SURFACE S1b | ANGLE θ | 0~50 | 0~50 | 0~50 |
|  |  | ANTI-REFLECTION COAT | NO. 14' | NO. 11' | NO. 6' |
|  | SURFACE S2b | ANGLE θ | 0~10 | 0~10 | 0~10 |
|  |  | ANTI-REFLECTION COAT | NO. 10' | NO. 8' | NO. 10' |

In the high NA lens of Example 6, when parallel rays having a wavelength of 405 nm were radiated on the lens surface S1*a*, the transmittance of the light was 96.4%, and the beam spot shape was good. Moreover, in the high NA lens of Example 7, when parallel rays having a wavelength of 405 nm were radiated, the transmittance of the light was 97.2%, and the beam spot shape was good. Consequently, it can be found that it is possible to provide object lenses having a high numerical aperture and a good light condensing performance according to Examples 6 and 7. Moreover, it can be found that the increase in the capacity of information recording can be realized by the use of the lenses of Examples 6 and 7 in an optical pickup apparatus.

On the contrary, in the lens of Comparative Example 3, when parallel rays having a wavelength of 405 nm were radiated on the lens surface S1, the transmittance of the light was the low value of 87%, and the beam spot shape was wide in the spot width, which was practically insufficient. Consequently, it can be known that the lens of Comparative Example 3 is unsuitable for the use of an object lens of an optical pickup apparatus using a laser beam having the wavelength of 405 nm, and that it is difficult to realize the increase in the capacity of light information recording by means of the lens according to Comparative Example 3.

The entire disclosure of Japanese Patent Application No. Tokugan 2003-146683 filed on May 23, 2003 including specification, claims, drawings and summary are incorporated herein by reference in its entirety.

What is claimed is:

1. An optical lens for condensing a light emitted from a laser light source on an optical recording medium, the light having at least one kind of a wavelength λ1 within a wavelength range from 400 nm to 440 nm, the optical lens being mounted in an optical information recording and reproducing apparatus capable of executing at least either a record of information on the optical recording medium or a reproduction of information recorded on the optical recording medium by condensing the light on the optical recording medium, the optical lens comprising:

a light incident side lens surface disposed on a side which the light emitted from the laser light source enters, the light incident side lens surface comprising a peripheral part having an angle θ of 45 degrees or more, where the θ is an angle formed by a normal line at a position on each lens surface and an optical axis; and a first anti-reflection film formed on the light incident side lens surface, the first anti-reflection film having a film thickness which is set so that a wavelength λ2 at which a reflectance of the light entering a central part of the light incident side lens surface at an angle of zero degrees has a local minimum value, satisfies λ1<λ2 and 420 nm≦λ2 680 nm, the central part having the angle θ of zero degrees.

2. The optical lens of claim 1, wherein the film thickness of the first anti-reflection film formed on the light incident side lens surface is set so that a wavelength λ3 at which the reflectance of the light entering the peripheral part having the angle θ of 45 degrees, of the light incident side lens surface at the angle of zero degrees has a local minimum value, satisfies 340 nm≦λ3≦560 nm.

3. The optical lens of claim 1, further comprising a light emergent side lens surface disposed on a side of emitting the light, the light emergent lens surface comprising a second anti-reflection film formed thereon, wherein the second anti-reflection film has a film thickness which is set so that a wavelength λ4 at which a reflectance of the light entering a central part having the angle θ of zero degrees, of the light emergent side lens surface at the angle of zero degrees has a local minimum value, satisfies 405 nm≦λ4≦500 nm.

4. The optical lens of claim 1, wherein the film thickness of the first anti-reflection film formed on the light incident side lens surface is set so that the wavelength λ2 at which the reflectance of the light entering the central part having the angle θ of zero degrees, of the light incident side lens surface at the angle of zero degrees has a local minimum value, satisfies 480 nm≦λ2≦570 nm.

5. The optical lens of claim 4, wherein the film thickness of the first anti-reflection film formed on the light incident side lens surface is set so that a wavelength $\lambda 3$ at which the reflectance of the light entering the peripheral part having the angle $\theta$ of 45 degrees, of the light incident side lens surface at the angle of zero degrees has a local minimum value, satisfies 400 nm$\leq \lambda 3 \leq$480 nm.

6. An optical lens for condensing a light emitted from a laser light source on an optical recording medium, the light having at least one kind of a wavelength $\lambda 1$ within a wavelength range from 400 nm to 440 nm, the optical lens being mounted in an optical information recording and reproducing apparatus capable of executing at least either a record of information on the optical recording medium or a reproduction of information recorded on the optical recording medium by condensing the light on the optical recording medium, the optical lens comprising:

a first lens which the light emitted from the laser light source enters and a second lens which the light passing through the first lens enters, wherein in the first lens, a first light incident side lens surface disposed on a side which the light emitted from the laser light source enters, comprises a peripheral part having an angle $\theta$ of 30 degrees or more, and in the second lens, a second light incident side lens surface disposed on a side which the light emitted from the laser light source enters comprises a peripheral part having the angle $\theta$ of 45 degrees or more, where the $\theta$ is an angle formed by a normal line at a position on each lens surface and an optical axis; and a first anti-reflection film is formed on the first light incident side lens surface, and a film thickness of the first anti-reflection film is set so that a wavelength $\lambda 5$ at which a reflectance of the light entering a central part of the first light incident side lens surface at an angle of zero degrees has a local minimum value, satisfies $\lambda 1 \leq \lambda 5$ and 410 nm$\leq \lambda 5 \leq$600 nm, the central part having the angle $\theta$ of zero degrees.

7. The optical lens of claim 6, wherein the film thickness of the first anti-reflection film formed on the first light incident side lens surface of the first lens is set so that a wavelength $\lambda 6$ at which the reflectance of the light entering the peripheral part having the angle $\theta$ of 30 degrees, of the first light incident side lens surface at the angle of zero degrees has a local minimum value, satisfies 370 nm$\leq \lambda 6 \leq$550 nm.

8. The optical lens of claim 6, wherein in the second lens, a second anti-reflection film is formed on the second light incident side lens surface, and a film thickness of the second anti-reflection film is set so that a wavelength $\lambda 7$ at which a reflectance of light entering a central part having the angle $\theta$ of zero degrees, of the second light incident side lens surface at an angle of zero degrees has a local minimum value, satisfies $\lambda 1 \leq \lambda 7$ and 420 nm$\leq \lambda 7 \leq$600 nm.

9. The optical lens of claim 6, wherein in the second lens, the film thickness of the second anti-reflection film formed on the second light incident side lens surface is set so that a wavelength $\lambda 8$ at which the reflectance of the light entering the peripheral part having the angle $\theta$ of 45 degrees, of the second light incident side lens surface at the angle of zero degrees has a local minimum value, satisfies 345 nm$\leq \lambda 8 \leq$490 nm.

10. The optical lens of claim 6, wherein in the first lens, a third anti-reflection film is formed on a first light emergent side lens surface disposed on a side of an emergence of the light from the first lens, and a film thickness of the third anti-reflection film is set so that a wavelength $\lambda 9$ at which a reflectance of the light entering a central part having the angle $\theta$ of zero degrees, of the first light emergent side lens surface at an angle of zero degrees has a local minimum value, satisfies 380 nm$\leq \lambda 9 \leq$500 nm; and in the second lens, a fourth anti-reflection film is formed on the second light emergent side lens surface disposed on a side of an emitting the light from the second lens, and a film thickness of the fourth anti-reflection film is set so that a wavelength $\lambda 10$ at which a reflectance of the light entering a central part having the angle $\theta$ of zero degrees, of the second light emergent side lens surface at an angle of zero degrees has a local minimum value, satisfies 380 nm$\leq \lambda 10 \leq$500 nm.

11. The optical lens of claim 6, wherein in the first lens, the film thickness of the first anti-reflection film formed on the first light incident side lens surface is set so that the wavelength $\lambda 5$ at which the reflectance of the light entering the central part having the angle $\theta$ of zero degrees, of the first light incident side lens surface at the angle of zero degrees has a local minimum value,satisfies 420 nm$\leq \lambda 5 \leq$480 nm.

12. The optical lens of claim 11, wherein in the first lens, the film thickness of the first anti-reflection film formed on the first light incident side lens surface is set so that a wavelength $\lambda 6$ at which the reflectance of the light entering the peripheral part having the angle $\theta$ of 30 degrees, of the first light incident side lens surface at the angle of zero degrees has a local minimum value, satisfies 380 nm$\leq \lambda 6 \leq$440 nm.

13. The optical lens of claim 6, wherein in the second lens, the film thickness of the second anti-reflection film formed on the second light incident side lens surface is set so that a wavelength $\lambda 7$ at which the reflectance of the light entering the central part having the angle $\theta$ of zero degrees, of the second light incident side lens surface at the angle of zero degrees has a local minimum value, satisfies 430 nm$\leq \lambda 7 \leq$480 nm.

14. The optical lens of claim 13, wherein in the second lens, the film thickness of the second anti-reflection film formed on the second light incident side lens surface is set so that a wavelength $\lambda 8$ at which the reflectance of the light entering the peripheral part having the angle $\theta$ of 45 degrees, of the second light incident side lens surface at the angle of zero degrees has a local minimum value, satisfies 357 nm$\leq \lambda 8 \leq$400 nm.

15. An optical lens for condensing a light emitted from a laser light source on an optical recording medium, the light having at least one kind of a wavelength $\lambda 11$ within a wavelength range from 630 nm to 680 nm, the optical lens being mounted in an optical information recording and reproducing apparatus capable of executing at least either a record of information on the optical recording medium or a reproduction of information recorded on the optical recording medium by condensing the light on the optical recording medium, the optical lens comprising:

a light incident side lens surface disposed on a side which the light emitted from the laser light source enters, the light incident side lens surface comprising a peripheral part having an angle $\theta$ of 45 degrees or more, where the $\theta$ is an angle formed by a normal line at a position on each lens surface and an optical axis; and a first anti-reflection film formed on the light incident side lens surface, the first anti-reflection film having a film thickness which is set so that a wavelength $\lambda 12$ at which a reflectance of the light entering a central part of the light incident side lens surface at an angle of zero degrees has a local minimum value, satisfies $\lambda 11<\lambda 12$ and 680 nm$\leq\lambda 12\leq$870 nm, the central part having the angle $\theta$ of zero degrees.

16. The optical lens of claim 15, further comprising a light emergent side lens surface disposed on a side of emitting the light, the light emergent lens surface comprising a second anti-reflection film formed thereon, wherein the second anti-reflection film has a film thickness which is set so that a wavelength $\lambda 13$ at which a reflectance of the light entering a central part having the angle $\theta$ of zero degrees, of the light emergent side lens surface at the angle of zero degrees has a local minimum value, satisfies 650 nm$\leq\lambda 13\leq$800 nm.

17. The optical lens of claim 15, wherein the film thickness of the first anti-reflection film formed on the light incident side lens surface is set so that a wavelength $\lambda 14$ at which the reflectance of the light entering the peripheral part having the angle $\theta$ of 45 degrees, of the light incident side lens surface at the angle of zero degrees has a local minimum value, satisfies 560 nm$\leq\lambda 14\leq$722 nm.

18. The optical lens of claim 15, wherein the film thickness of the first anti-reflection film formed on the light incident side lens surface is set so that the wavelength $\lambda 12$ at which the reflectance of the light entering the central part having the angle $\theta$ of zero degrees, of the light incident side lens surface at the angle of zero degrees has a local minimum value, satisfies 710 nm$\leq\lambda 12\leq$850 nm, and so that a wavelength $\lambda 14$ at which a reflectance of the light entering the peripheral part having the angle $\theta$ of 45 degrees, of the light incident side lens surface at the angle of zero degrees has a local minimum value, satisfies 580 nm$\leq\lambda 14\leq$705 nm; and a film thickness of a second anti-reflection film formed on the light emergent side lens surface on the side of an emergence of the light from the optical lens is set so that a wavelength $\lambda 13$ at which the reflectance of the light entering the central part having the angle $\theta$ of zero degrees, of the light emergent side lens surface at the angle of zero degrees has a local minimum value, satisfies 670 nm$\leq\lambda 13\leq$800 nm.

19. The optical lens of claim 15, wherein the optical lens condenses a first light emitted from a first laser light source on a first optical recording medium, and a second light emitted from a second laser light source on a second optical recording medium, respectively, the first light having at least one kind of the wavelength $\lambda 11$ within the wavelength range from 630 nm to 680 nm, and the second light having at least one kind of a wavelength $\lambda 15$ within a wavelength range from 770 nm to 790 nm.

20. The optical lens of claim 15, wherein the film thickness of the first anti-reflection film formed on the light incident side lens surface is set so that the wavelength $\lambda 12$ at which the reflectance of the light entering the central part having the angle $\theta$ of zero degrees, of the light incident side lens surface at the angle of zero degrees has a local minimum value, satisfies 710 nm$\leq\lambda 12\leq$790 nm; and a film thickness of a second anti-reflection film formed on the light emergent side lens surface disposed on a side of an emergence of the light from the optical lens, is set so that a wavelength $\lambda 13$ at which the reflectance of the light entering the central part having the angle $\theta$ of zero degrees, of the light emergent side lens surface at the angle of zero degrees has a local minimum value, satisfies 710 nm$\leq\lambda 13\leq$790 nm.

21. The optical lens of claim 20, wherein the film thickness of the anti-reflection film formed on the light incident side lens surface is set so that a wavelength $\lambda 14$ at which the reflectance of the light entering the peripheral part having the angle $\theta$ of 45 degrees, of the light incident side lens surface at the angle of zero degrees has a local minimum value, satisfies 590 nm$\leq\lambda 14\leq$660 nm.

22. The optical lens of claim 1, wherein each anti-reflection coat is formed by one of a vacuum evaporation method, a sputtering method, a spinning coating method, a dipping coating method, a CVD method and an atmospheric pressure plasma method.

23. The optical lens of claim 1, wherein the anti-reflection coat is made of one of a high refractive index material, an intermediate refractive index material and a low refractive index material.

24. An optical information recording and reproducing apparatus comprising a laser light source and an optical lens of claim 1, wherein the apparatus executes at least either a record of information on an optical recording medium or a reproduction of information recorded on the optical recording medium by condensing a light emitted from the laser light source with the optical lens.

* * * * *